(12) United States Patent
Sherman et al.

(10) Patent No.: US 6,205,575 B1
(45) Date of Patent: *Mar. 20, 2001

(54) SCENARIO PRESENTATION TOOL

(75) Inventors: William Sherman, Belle Mead, NJ (US); Wen-Pao Liao, Staten Island, NY (US); Marina Klinger, Belle Mead, NJ (US)

(73) Assignee: Siemens Corporate Research, Inc., Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,865

(22) Filed: Aug. 4, 1997

Related U.S. Application Data

(63) Continuation of application No. 08/423,919, filed on Apr. 18, 1995, now abandoned.

(51) Int. Cl.⁷ .................................................. G06F 9/45
(52) U.S. Cl. .................................. 717/1; 345/967; 717/2
(58) Field of Search ...................... 395/701, 702, 395/919, 949, 967, 703; 364/489; 345/949, 967, 919; 717/1, 2, 3, 4

(56) References Cited

U.S. PATENT DOCUMENTS

| 5,247,651 | * | 9/1993 | Clarisse ................................ 395/500 |
| 5,311,422 | * | 5/1994 | Loftin et al. ......................... 364/401 |
| 5,544,067 | * | 8/1996 | Rostoker et al. ..................... 364/489 |
| 5,555,201 | * | 9/1996 | Dangelo et al. ..................... 364/489 |

* cited by examiner

*Primary Examiner*—Kakali Chaki
(74) *Attorney, Agent, or Firm*—Adel A. Ahmed

(57) ABSTRACT

A scenario presentation tool or system provides for the definition, maintenance, and presentation of scenarios. The scenarios comprise a series of steps representing the dynamic behavior of a system. The tool utilizes a system description and includes arrangements for reading and presenting the system description and an arrangement for selecting elements from the system description and for facilitating the definition, maintenance, and presentation of scenarios. The method comprises the steps of defining a sequence of steps by selecting elements from the system description in accordance with a predetermined syntax and saving the steps with sufficient information to reproduce the scenarios.

65 Claims, 25 Drawing Sheets

MAJOR MODES

SCENARIO PRESENTATION TOOL

CROSS-REFERENCE TO RELATED APPLICATION

Figure 1:
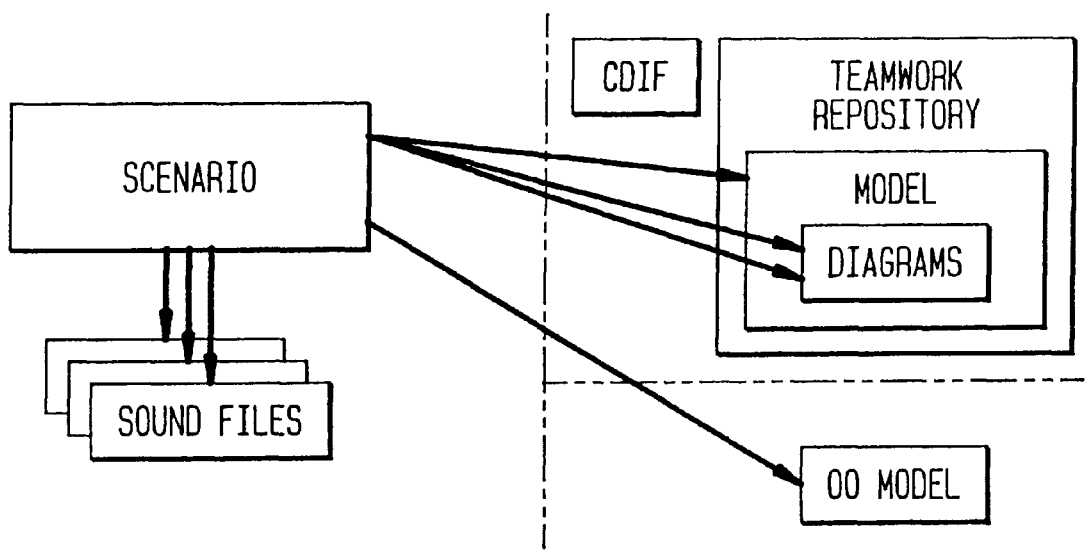

This is a continuation of Ser. No. 08/423,919 filed Apr. 18, 1995, now abandoned.

The early phases of software system design for a customer are generally performed by a team of analysts who depend on their abstraction and communication skills to perform the tasks of specifying the requirements of the proposed system and representing these requirements in textual descriptions and diagrams. Typically, such analysts will have to reach a consensus among themselves that their design approach will meet the requirements. Next, they must describe to the customer their proposed solution to the problem. Once agreement has been reached that the proposed design will satisfy the customer's needs, the proposed design must be communicated to a larger team with responsibility for the system implementation.

The task of generating and reviewing large software system design specifications can be an inefficient use of design time since the documents that are produced are often too complex to be readily comprehensible. The participants in a design review are typically expected to have read and thoroughly understood the specifications. In a typical working environment, such an expectation is usually unreasonable for large design specifications as most projects are limited by tight schedules. Many of the reviewers will not be able to allocate sufficient time to the review of large design specifications. Design reviewers often concentrate only on the areas of their particular interest, and they may fail to see the overall picture or design defects in other areas of the design.

In a typical prior art approach, software engineering staff in a research laboratory may be called in to support design reviews of a new product being developed by a company. Such a product may readily contain 150,000 to 200,000 (150 k to 200 k) lines of, for example, C code when implemented. The project design team may use a commercially available tool such as Cadre Teamwork to illustrate the dataflows for the design. Typically, a large stack of dataflow diagrams is then printed and inserted into design notebooks, and projector slides such as viewgraphs are made for the design review meetings. Such a stack of diagrams can become very thick and, in the interest of practical convenience, designers would accordingly generally present only important components of the design to the review teams. For example, an approach used for review meetings might be to define scenarios of important product functions, and then "walk through" the annotated dataflow diagrams to illustrate the sequential behavior of the design model. It is herein recognized that this approach has value both for designing and reviewing the designs of complex software systems. It also herein recognized that automated support for defining scenarios and "walking through" design documentation is desirable.

In order to build a software system, it is necessary to first describe the system requirements. The requirements are usually described in text that may be ambiguous and misleading. Analysis of the requirements results in a more precise system description that can be represented in many forms, such as dataflow diagrams, pseudo-code, sequence charts, and so on.

Thus, scenarios are useful early in the software design process for specifying what the designer wants the system to do. Scenarios are sequences of transition and activity which specify the desired system behavior. Their advantage is that valuable illustrations of the working system can be developed quickly. The dynamic behavior is often the most important aspect of a system being developed. However, many software development methods focus the designer's attention on the system structure or architecture. Since the structure is emphasized first, more effort is expended in this area and correspondingly less effort is put into the analysis of the dynamic behavior. It is important to view the design from three perspectives: structure, data, and behavior. The emphasis will vary by the nature of the system being designed, but it is important that all three be considered.

A more productive approach can involve the reviewing of a smaller set of key design diagrams accompanied by a set of important scenarios. The scenarios are used to "walk" through the design for review or "shake-out". These scenarios can then become a useful form of documentation throughout the life of the project. Although a number of development organizations are currently defining scenarios, there is limited computer aided software engineering (CASE) tool support for these efforts. In addition, many development organizations could improve their designs by taking more advantage of scenarios in the early phases of system development.

Scenarios can be used for describing and communicating a system design for review purposes. Since people tend to describe how things work in terms of scenarios, it is useful to capture these scenarios and make them part of the software development methodology.

The scenarios focus attention on a particular behavior or function thread of the system and they provide an alternative to trying to imagine and mentally juggle the complex interactions of the entire system at once. CASE tools provide the capability to model a large problem by means of decomposition and abstraction. Scenarios are slices of the system behavior which can be considered one at a time in terms of the system model.

Scenarios have wide appeal because of the many benefits obtained over the life of a software development project for minimal investment. In the early stages of a project, scenarios have the ability to bring a design to life and illustrate what the designers have created. Verification that all the software system requirements have been covered is facilitated using scenarios. Software systems designs can become better documented, thereby relieving experienced design personnel from having to explain all of the details of a design to reviewers, coders, testers, maintainers, and customers as they become involved with a project in later stages of development and delivery.

The subject matter of the present application is closely related to that of the copending application entitled "METHOD FOR ANIMATING COMPOSITE BEHAVIOR OF SCENARIOS" being filed concurrently herewith in the name of the same inventors as the present application, now abandoned and whereof the disclosure is herein incorporated by reference.

The following are among the definitions herein adopted for purposes of clarity.

Scenario

A scenario is a sequence of steps. The scenario also has a title, description, and associated requirements. The description is typically a summary of what function thread is being illustrated along with some context setting information and possibly an initial state.

Step

Each step of a scenario comprises a source node, a directed flow, and a destination node. The flow conveys a message or a value from the source to the destination. A step may have a description and state change information associated with it. The state indicates the name of the system, subsystem, or object state following the completion of that step.

Node

On a dataflow diagram, a node is a process bubble, a terminal, a data store, a control element, or an offpage reference. Offpage references are connections to the parent level diagram. For object oriented system designs, nodes are the objects.

Flow

On a dataflow diagram, flows may be unidirectional or bidirectional. They may connect elements on the diagram together, or they may connect diagram elements to the parent level via offpage connectors. The flows may have names, and the data being transferred from source to destination are the messages. In an object oriented system, the flows are the relationships between classes. The messages being sent from the source object are method invocations on the destination object.

Animation

Animation is provided to illustrate the step-by-step nature of a scenario. The nodes and flows provide graphical techniques for depicting emitting a message, receiving a message, and transferring a message. Use of animation leads the user through the scenario, and eliminates translating between a textual description and lifeless static diagrams.

Phantom

A phantom is a missing design diagram element that the scenario requires. It is a node or a flow in a dataflow diagram that has been deleted, renamed, or redefined on the underlying design diagram. It is herein recognized that phantoms can be displayed in a contrasting color to attract the user's attention to them. If phantoms are present, the scenario is out-of-date with respect to the design diagram and needs to be corrected.

Scenarios are defined by indicating on a dataflow diagram the order of activity and flows to achieve a particular fragment of system functionality. The dataflow diagrams do not show temporal information, since they are intended to depict only hierarchical decomposition and interrelationships between functions. In an object oriented system design, a scenario is defined by selecting the participating objects and including them within a message sequence chart. On this chart, the messages are sent from one object to another in their ordered time sequence.

Based upon experience and observation of software design projects, it is believed that scenarios offer a number of specific benefits over the life of a project, including:

Requirements Tracking and Tracing

Scenarios are based on requirements. They illustrate how the proposed system will meet the requirements. It is therefore possible to track the requirements during the various phases of a development project through the use of scenarios. Requirements coverage can be assured and code modules can be traced back to the original requirements.

Communication

Scenarios offer an excellent vehicle for communication. They are useful for design reviews, customer training, and maintenance. Newcomers to a project can learn about the system with minimal drain on experienced personnel.

Documentation

Scenarios document the desired behavior. This information is critical and needs to be kept accurate and up-to-date. When a design is changed or migrated to another environment, the behavioral description provided by the collection of scenarios directly supports these efforts. There should be no need to reread volumes of specifications or the code itself to discover how parts of the system work.

Design Iteration

When a scenario is being defined or when an animation is executed, the designer's thought processes are stimulated into thinking about what is being presented. Alternative paths, missing parts, and different abstractions are always being considered by creative designers. This may lead to modification of the design when better representations are identified. Scenarios can be refined and expanded as the design evolves.

Failure Cases

Expressing the desired behavior of the system includes situations when incorrect data arrives, resources are consumed, or time-outs occur. Scenarios can be used to illustrate the fail-safe actions of the system under unusual circumstances. This kind of documentation is especially important in safety-critical or highly dependable applications.

Test Case Definition

Each scenario can potentially be used as the basis for one or more test cases. Depending on the level of abstraction, the scenario details a thread of system activity that is desired and should therefore be tested to verify that it occurs.

Behavior Verification

The scenarios defined at the beginning of the project can be used to compare with event traces captured during simulation runs or actual program execution. Comparison will show areas of mismatch which can be analyzed to determine if any corrections need to be made. Such dynamic testing verifies that the requirements are being met by the implementation. This emphasizes the linkage between the code modules and the requirements.

Performance Improvement

Analysis of a collection of scenarios may reveal paths and nodes that are referenced very often. This can identify potential bottlenecks that could negatively impact the system performance. The designers can use this information to make decisions about rerouting message traffic or replicating functions to improve the overall throughput or performance of the system.

Impact Analysis

Maintainers can take advantage of scenarios by analyzing the interactions between the various parts of the system. They can determine what the overall impact will be if a modification is made to part of the system. This will encourage alternative approaches to be considered, especially if the proposed changes will affect more of the system than anticipated.

Although the concept of scenarios used for software design has been around for a few years, recent books and papers are promoting their use, such that their automation can lead to better ways of designing and developing software systems. Examples include a book on design methods for concurrent and real-time systems written by Dr. Hassan Gomaa of George Mason University, Gomaa, H., Software Design Methods for Concurrent and Real-Time Systems, Addison-Wesley, 1993 and a recent paper in IEEE Software written by collaborators at the University of Texas and Fujitsu Network Transmission Systems, Hsia, P., et al. "Formal Approach to Scenario Analysis," IEEE Software, March 1994.

The use of scenarios is gaining momentum among software methodologists and designers for supporting a number of different design methods. Some of these methods are summarized below.

Object Modeling Technique (OMT)

After creating the entity-relationship diagram in OMT, the expected behavior is described in textual terms. The textual descriptions are graphically illustrated as a message sequence chart where the vertical lines are the objects and the messages are the method invocations (see FIG. 3—3). These message sequence charts are referred to as event trace diagrams. The event traces can be redrawn as event flow diagrams. The objects are drawn as rectangles and the messages are drawn as dataflows between the objects. A number of scenarios can be combined in a single event flow diagram to build up a composite picture of the system (see FIG. 3-4). OMT is described in Rumbaugh, James, et. al., Object-Oriented Modeling and Design. Prentice Hall, Englewood Cliffs, N.J., 1991. and is supported by CASE tools from vendors such as Protosoft, IDE, and Cadre.

Use Cases

After all the users (actors) that interact with the system have been identified, use cases are defined. Emphasis is placed on defining each actor's interaction with the system. Use cases describe how the system performs the requested functions. These are scenarios that are always depicted from the external user's point of view. Use cases are described in Object-Oriented Software Engineering—Jacobson, Ivar, et. al., Object-Oriented Software Engineering—A Use Case Driven Approach. ACM Press, Addison-Wesley Publishing Company, 1992. and a tool named Objectory is available from Objectory AB of Kista, Sweden.

Personification

Peter Coad, of the company Object International, encourages the process of acting out the system to stimulate the kinesthetic memory. Emphasis is placed on multiple channels of input to the brain. As a group activity, the objects of the system are personified by people who have the responsibility of describing what their object will do when receiving a particular message. A ball is tossed around which represents a message being passed. When the ball is tossed to a person, the message is announced and the receiver tells what their object does at that time. The ball is then tossed to the next appropriate object. Coad's point is that people get a better understanding of a problem by going through physical, visual and audible channels. His famous quote is: "When in doubt, act it out." These group activities are in fact scenarios that are acted out instead of written down. Coad's company, Object International, offers training courses and videotapes which emphasize his approach to acting out the behavior of the objects in the system.

Concurrent Design Approach for Real-Time Systems (CODARTS)

CODARTS is an object-oriented software design method for concurrent and real-time systems that emphasizes the structuring of a system into concurrent tasks (active objects). The method uses scenarios, and it provides support for information hiding (passive objects). It also supports the design of distributed applications that execute on geographically distributed nodes. In CODARTS, scenarios are included as part of the state dependent behavioral analysis as described in Software Design Methods for Concurrent and Real-Time Systems, Gomaa, cited above. There are three main steps:

1. build the scenarios, using the state transition diagram and list of external events;

2. execute each scenario, by manually "walking through" the state transitions for each external event; and 3. complete the scenarios, by ensuring that the executed scenarios have driven the state transition diagram through every state.

CASE tool support for CODARTS is provided by Mark V and Cadre. The method has emerged from the aerospace industry and it is also becoming more widely used for other industrial applications.

Animation vs. Simulation

Animation is visually appealing. It is always interesting to see something come to life as a result of a design effort. Visual verification helps form intuition and understanding which can be applied in all steps of the design process. In considering the question of what can be animated, it is noted that animation requires at least a set of entities, a set of transitions or dataflows, and some control. In the early phases the control is often lacking, but this can be supplied by assertion. That is, the sequence of events can be postulated by the designer in a scenario that depicts what the system is supposed to do. This sequence of activity can then be captured and animated on the diagrams created to model the system.

More elaborate animations can show the allocation and deallocation of memory, variable updates, heap size, stack contents, file i/o, and other activities of interest. In object-oriented (OO) systems, object creation and deletion, and thread of control are of considerable interest. However, to provide animation requires the ability to perform an actual simulation of the system. A simulation requires a significant amount of the system design before anything can be done at all. That is, it is required that the actual system control be defined in sufficient detail so that the system can be effectively "executed" in the simulation environment. Animation, in contrast, can be performed at much earlier stages of design.

Early in the design phase, scenarios can be used to specify how the system will behave. The advantage of this approach is that valuable illustrations of the working system can be developed with little effort. These informal descriptions become more precise with repeated iteration. A scenario can be thought of as an "instant prototype" of a portion of the desired system functionality that can be animated for presentation at a design review.

In accordance with an aspect of the invention, a scenario presentation tool or system for the definition, maintenance, and presentation of scenarios, the scenarios comprising a series of steps representing the dynamic behavior of a system, the tool utilizing a system description and including means for reading and presenting the system description and means for selecting elements from the system description and for facilitating the definition, maintenance, and presentation of scenarios, comprises the steps of: defining a sequence of steps by selecting elements from the system descripion in accordance with a predetermined syntax; and saving the steps with sufficient information to reproduce the scenarios.

In accordance with another aspect of the invention, the system description comprises an object model of the type utilized in object oriented analysis and including means for reading and displaying such object information and selecting elements therefrom, the object model representing the result of an object oriented analysis of the system, wherein the sequence of steps is defined by selecting elements from the model in accordance with a predetermined syntax and the steps are saved with sufficient information to reproduce the scenarios in the event the model has changed.

In accordance with another aspect of the invention, a scenario is at least in part defined, including a step of sequential animation wherein the steps are animated sequentially by way of a graphical technique.

In accordance with another aspect of the invention, the animation step includes the presentation of a pertinent textual annotation.

In accordance with another aspect of the invention, the animation step includes the presentation of a pertinent voice annotation.

In accordance with another aspect of the invention, the sequential animation is synchronized with the pertinent voice annotation.

In accordance with another aspect of the invention, the sequential animation is synchronized with the pertinent voice annotation such that animation of a step does not begin until completion of the voice annotation pertaining to the preceding step.

In accordance with another aspect of the invention, the scenario comprises a header, diagram information and a step list.

In accordance with another aspect of the invention, the scenario comprises a requirements list and a columns list.

In accordance with another aspect of the invention, the header comprises a scenario name, a filename version, textual annotation or description, a methodology, a viewform, an initial state a voice annotation or soundfile.

In accordance with another aspect of the invention, the diagram information comprises a model, a diagram ids, diagram names, elements, element types, positions, sizes, names, instance numbers, ids, and flow direction.

In accordance with another aspect of the invention, the Step list diagram comprises a source object destination object, and a method invocation on the destination.

In accordance with another aspect of the invention, the Requirements list comprises a name and a description.

In accordance with another aspect of the invention, the columns list comprises an object and an initial state for the object.

In accordance with another aspect of the invention, the Requirements list comprises a name and a description.

In accordance with another aspect of the invention, the system description comprises a hierarchy of data flow diagrams of the type utilized in structured analysis and structured design, and including means for reading and displaying such data flow diagrams and selecting elements thereon, for facilitating the definition, maintenance, and presentation of scenarios, the data flow diagrams representing a functional decomposition of the system, wherein the sequence of steps is defined by selecting elements on the data flow diagrams in accordance with a predetermined syntax and the steps are saved with sufficient information to reproduce the scenarios in the event the data flow diagrams are missing, at least in part.

In accordance with another aspect of the invention, the A scenario presentation system includes a browse mode, wherein the definition comprises the following steps:

upon selection by a user of one of New Scenario and Define steps, the system leaves the browse mode and enters a Define steps mode, the system at this point awaiting the user to select one of a source node and a flow;

selection of a unidirectional flow being sufficient to define a step because it is unambiguous and it connects two nodes to each other;

upon selection of a bidirectional flow, this being an ambiguous state requiring a definition of which one of the nodes is the destination, the system awaits a destination node; and upon receiving an invalid entry, issues a complaint signal.

In accordance with another aspect of the invention, the definition comprises the following steps:

upon selection by a user of one of New Scenario and Browse modes, the system transitions from Browse mode to a Define steps mode;

upon selection of a source column by the user, the system awaits selection of a destination column;

upon selection of an invalid column while waiting for destination, the system will issue a complaint message;

upon selection of a valid column, the system presents for selection all legal connections, since this is on a SASD data flow, all the legal connections can be presented for selection; and in the event of only one single valid connection being possible, the system provides it automatically and the step is defined.

In accordance with another aspect of the invention, a step conveys information from a source node to a destination node by way of data flow, wherein the step of saving includes storing diagrammatic information on the source node, the destination node, and the data flow.

In accordance with another aspect of the invention, the diagrammatic information includes name, position, and type information on the nodes and data flow, with directionality information.

In accordance with another aspect of the invention, the scenario presentation tool includes a step of conveying information from a source node to a destination node by way of data flow, wherein the information includes any of a value, a data type, and a symbolic reference.

In accordance with another aspect of the invention, the scenario presentation tool includes a step of conveying information from a source node to a destination node by way of data flow, wherein the information includes any of a voice annotation, textual annotation, and state change information.

In accordance with another aspect of the invention, the scenario comprises a header, diagram information and a step list.

In accordance with another aspect of the invention, the scenario comprises a requirements list and a columns list.

In accordance with another aspect of the invention, the header comprises a scenario name, a filename version, textual annotation or description, a methodology, a viewform, an initial state a voice annotation or soundfile.

In accordance with another aspect of the invention, the diagram information comprises a model, a diagram ids, diagram names, elements, element types, positions, sizes, names, instance numbers, ids, and flow direction.

In accordance with another aspect of the invention, the diagram information comprises model column information (MSC) saved in the order it was last displayed, column names, column positions, rows saved as flows in sequence from top to bottom, names, positions, directions, source, and destination.

In accordance with another aspect of the invention, the Step list comprises a diagram, a source node, a flow id, a destination node, an id value, a description, a state, a state scope, and a soundfile.

In accordance with another aspect of the invention, the Step list comprises a diagram, a source object, a destination object, and a method invocation on the destination.

In accordance with another aspect of the invention, the Requirements list comprises a name and a description.

In accordance with another aspect of the invention, the columns list comprises a diagram and a node.

In accordance with another aspect of the invention, the Requirements list comprises a name and a description.

Figure 2:
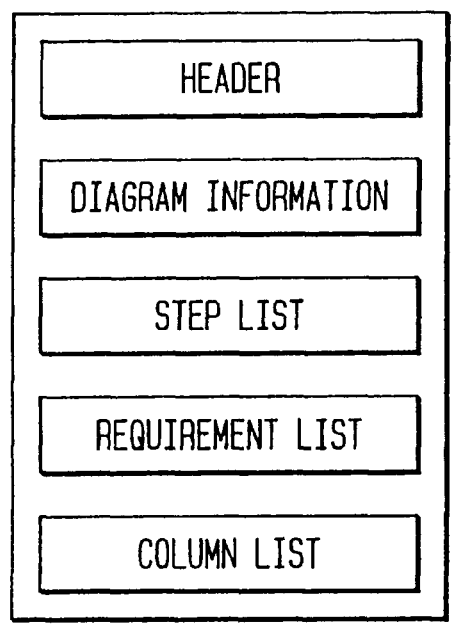
Figure 3:
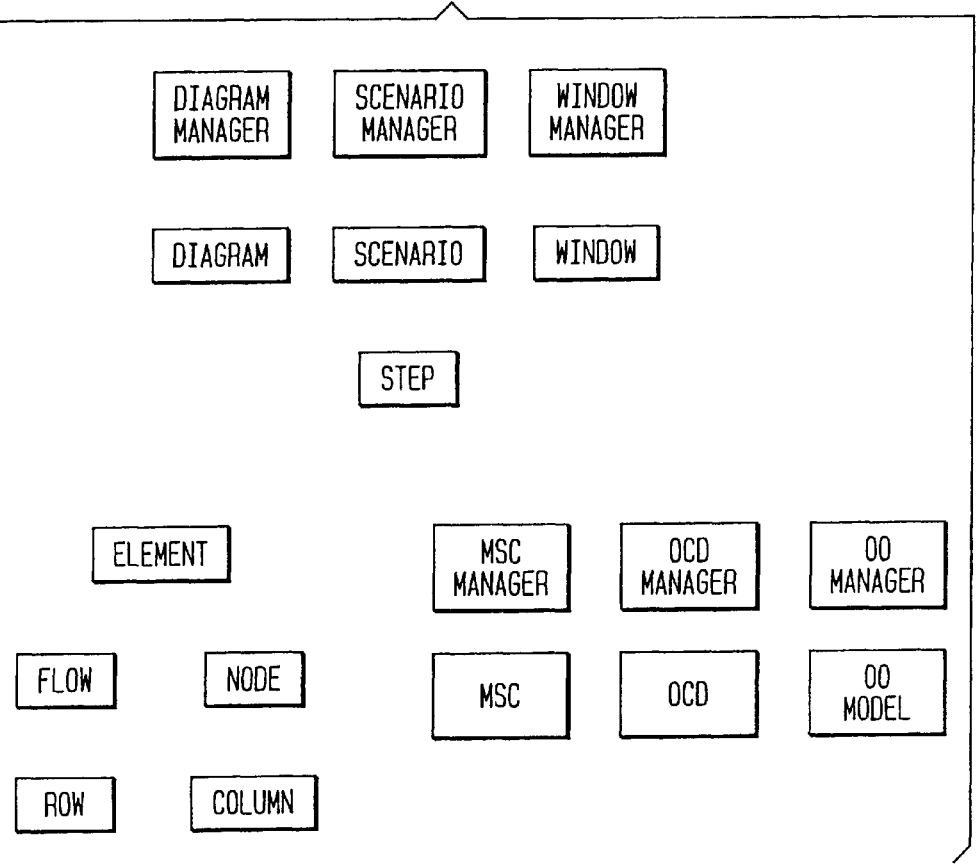
Figure 4:
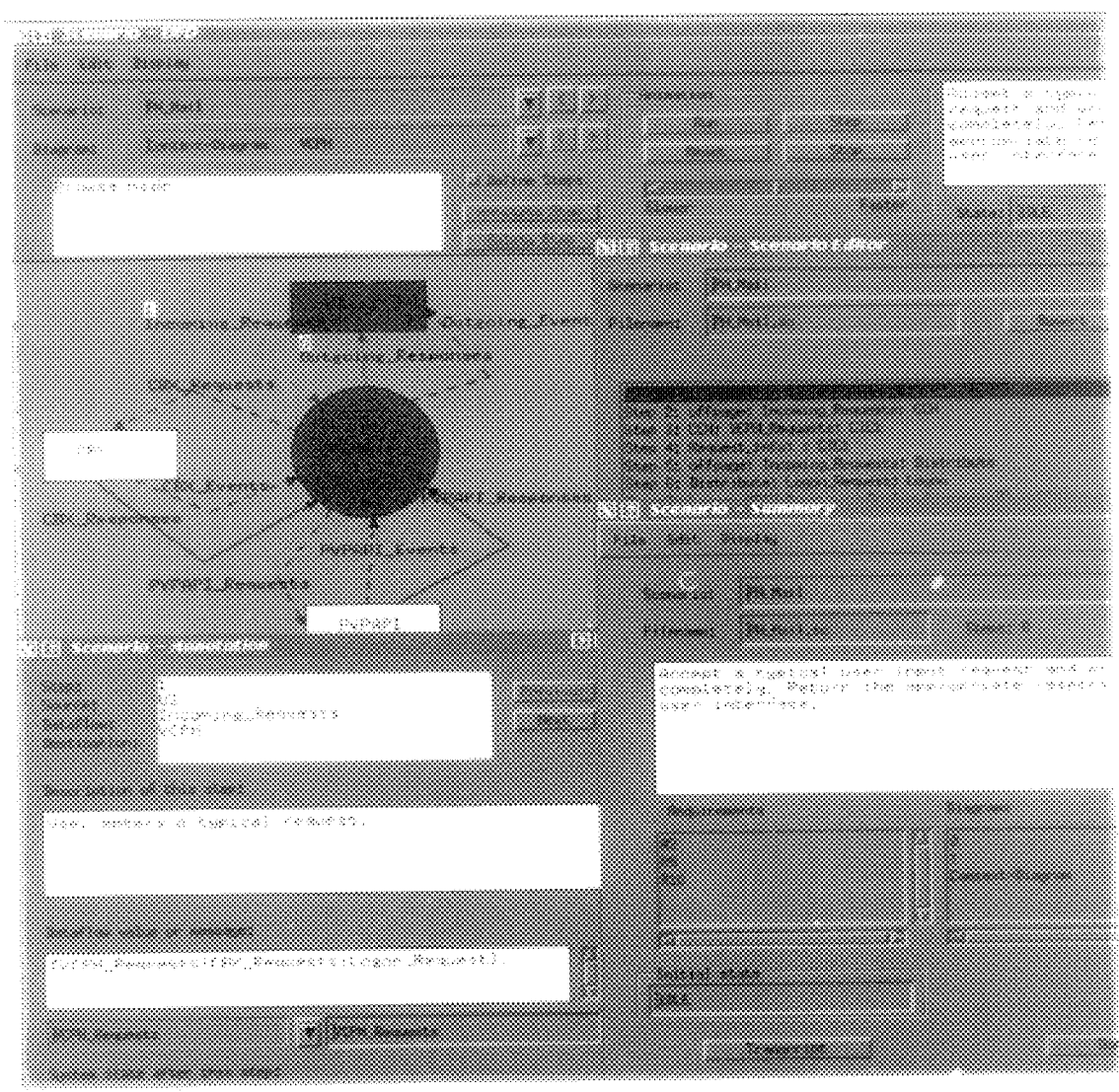
Figure 5:
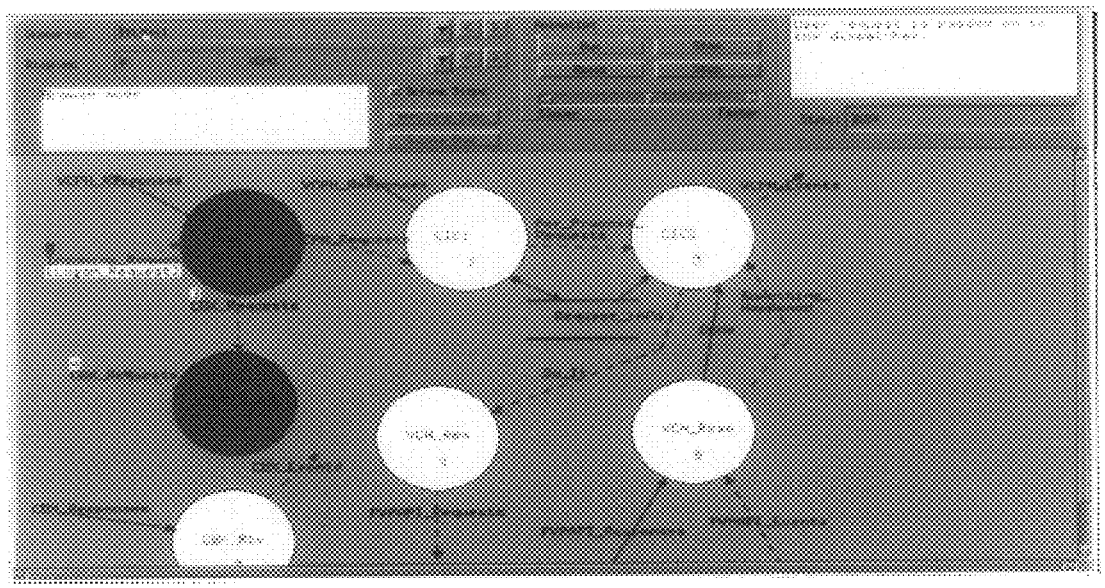
Figure 6:
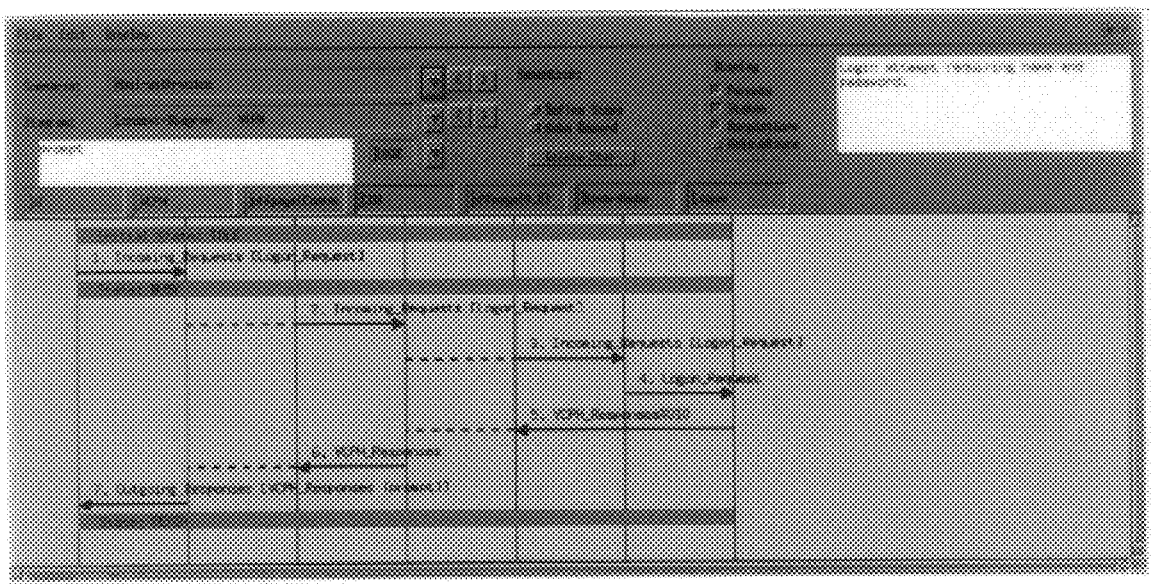
Figure 7:
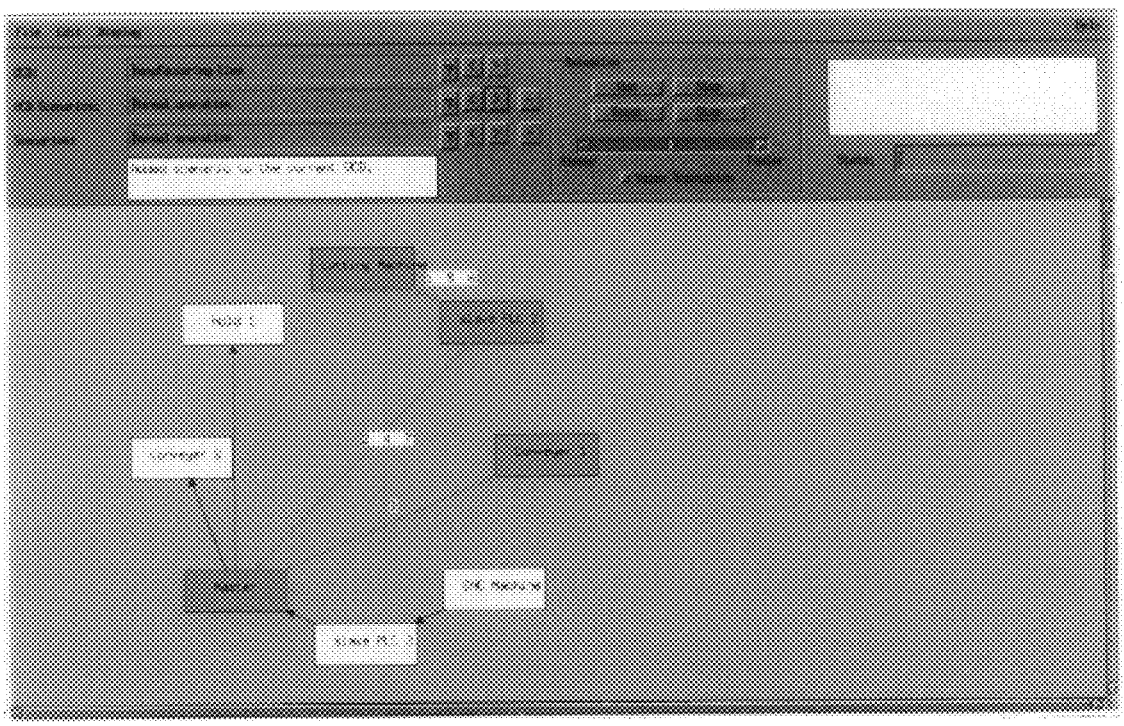
Figure 8:
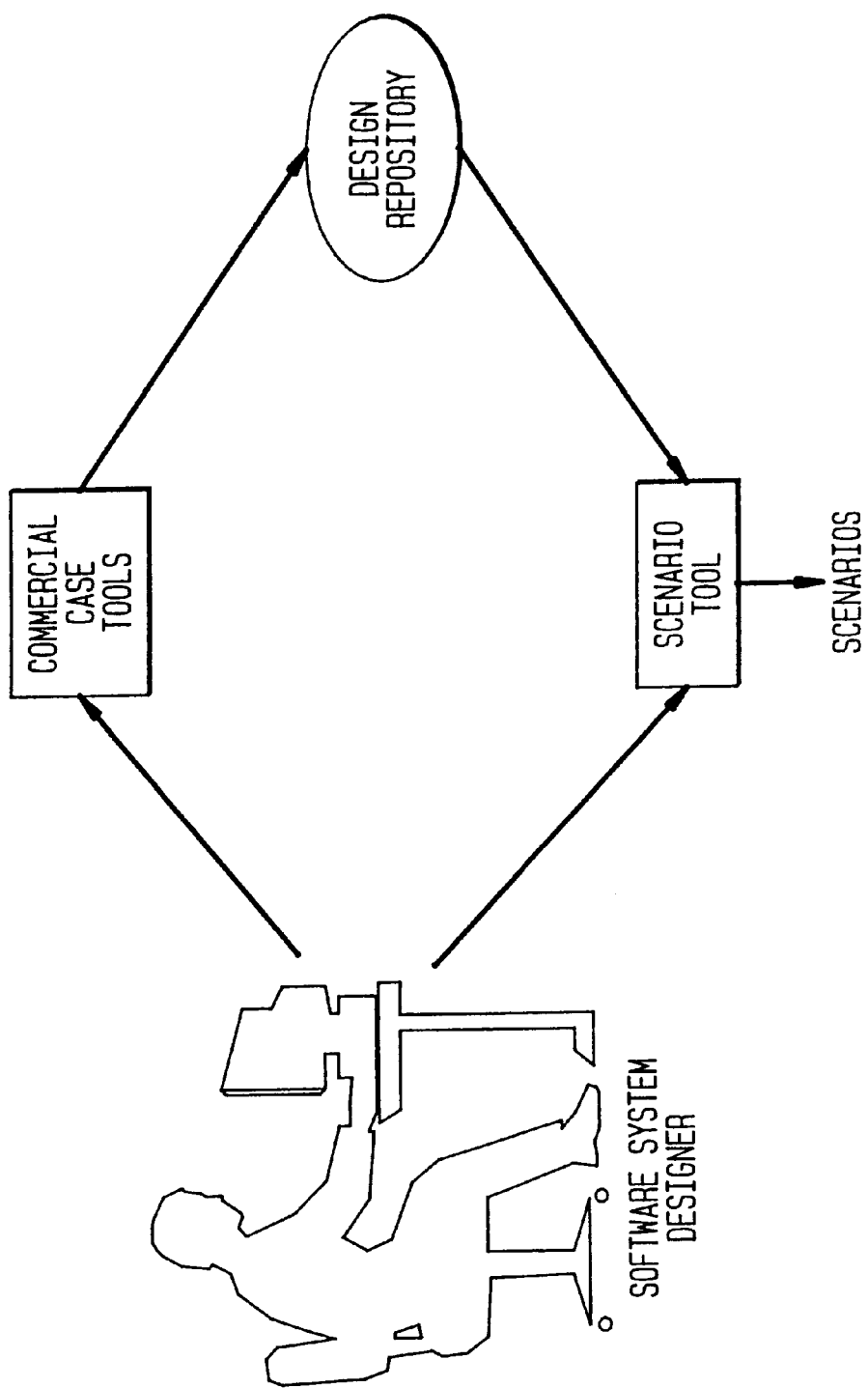

The invention will be more fully understood from the following detailed description, in conjunction with the Drawing, in which FIG. 1 which shows the file relationships relating to the invention;

FIG. 2 which shows a scenario file structure and definition;

FIG. 3 which shows a plan of scenario tool architecture in accordance with the invention;

FIG. 4 which shows a window montage in accordance with the invention;

FIG. 5 which shows the animation of a step in accordance with the invention;

FIG. 6 which shows a message sequence chart in accordance with the invention;

FIG. 7 which shows an object communication diagram in accordance with the invention;

FIG. 8 which shows a scenario tool interface approach in accordance with the invention;

FIGS. 9–23 and 29 which show flow charts helpful to an understanding of the invention; and FIGS. 24–28 which schematics of state machines helpful to an understanding of the invention.

In applying scenarios to software development, it is noted tht scenarios can be applied to activities across the phases of the software development life-cycle. Phases within which scenarios can be applied include:

Requirements Elicitation from Customer/User
Review with Customer/User
Requirements Definition, Analysis & Review
User Interface Definition
Design
Design Analysis & Review
Testing
Maintenance.

Since scenarios are used to define what the system will do, they may be jointly defined with customers, marketing, or system engineering. These descriptions can be animated to better illustrate how the proposed design will implement the requirements.

As the design develops, the design descriptions may contain enough information to automatically simulate the system. Scenarios can be compared with event traces captured by simulation to verify compliance with the initial requirements. During the coding and integration phases, scenarios can be used to test and verify that the execution of the actual system meets the requirements. Other potentially high leverage applications of scenarios include:

Impact analysis—evaluating how changes to the design of the system will potentially affect its operation and functionality.

Automated testing—using test case scenarios to drive the test inputs and compare results within an automated test environment.

Requirements definition, coverage, and tracking—using scenarios as a means of describing the functionality of the system, and then tracking the scenarios as the system is developed and tested.

Educating new developers, maintainers, customers, or service personnel on a new system—either in early phases of development when the scenarios represent the desired system behavior, or later when the scenarios represent the implemented system behavior.

Process definition and communication—for specifying the process used by the software engineering organization to develop products, and training the development staff on its use.

Hazard analysis—to help identify possible behavior of the system that may result in unsafe operation.

Another area of application is in design review. A typical use of scenarios in organizations that use structured analysis and real time design methods is to develop a collection of high level dataflow diagrams and then annotate them with numerical references depicting the scenario thread. This is started very early in the design when almost no formal information is defined for the dataflows or the processes.

For example, a software development organization might use the commercially available Cadre Teamwork for the creation of the dataflow diagrams. These are then given to an illustrator with specific instructions about where the numbers go to define the scenarios. The resulting annotated diagrams are then used in reviews by a presenter who explains the sequences shown in the diagrams. When questions arise during the presentation, they are dealt with immediately or written down for further consideration. It is often necessary to flip back and forth between several diagrams to follow the thread of control. Automated support is needed for the creation, presentation and maintenance of these scenario packages. It is also desirable to create the product design documentation along with the review presentation.

Questions of documentation, training, and maintenance need also to be considered. The ability to create and maintain scenarios provides valuable documentation support throughout the software development life-cycle. Furthermore, if tool support is available to animate the scenarios, key aspects of the software system can be more readily communicated. These key aspects can be communicated among designers, as described above during design reviews, but also among users and staff that support the software system. Animation of the scenarios is one step towards "living documentation" in which key aspects of the software system can be better visualized. Since scenarios are easily defined, they can be used for quickly training others on the operation of the software system. The coupling of animation with training can be very useful for staff that must quickly learn the system, such as for staff that maintain the software. These software maintenance engineers must quickly visualize the operation of the software system, so that they can isolate and correct defects without negatively impacting other operational components of the system.

In the consideration of structured analysis and real-time design, it is noted that designers using structured analysis and real-time techniques usually start representing the software system using dataflow diagrams. Scenarios are then defined which indicate the desired threads of activity within the proposed system.

FIG. 3-2 shows a dataflow diagram upon which a scenario has been constructed. The numbers indicate the sequence of the thread of control. A tool that provides support for this type of scenario includes capabilities such as capture/playback, diving to lower levels, and printout of transcripts. Error checking prevents the creation of improper scenarios such as, for example, the violation of arrows on dataflows. Selection of data items on the dataflows is assisted with pulldown menus. Playback could be continuous, with variable delay between steps, or single steps. Single stepping allows access to the details of dataflows or lower level scenarios.

Many of the existing object-oriented analysis/object-oriented design (OOA/OOD) methodologies already suggest the use of scenarios, and even provide notations for describing scenarios. However, details on how scenarios are used are sometimes missing, and tool support is often weak or non-existent.

It is herein recognized that a first step in OO analysis is to start identifying potential classes and objects in the system. Following a rough cut at object identification, an object model diagram is constructed. At this point, the responsibilities of the objects are considered. This may take the form of messages that will be sent to the objects or direct assignment of names to the methods of the objects. Many iterations of these diagrams leads eventually to a satisfactory solution.

Since OO analysis concentrates on the encapsulation of data structures into objects and the relationships between objects, it is difficult to think about sequences of activity and dataflow. This is because the major methodologists have eschewed functional decomposition in favor of a data centric view. The dynamic behavior is often the most important element of many systems, and it needs to be represented and captured. State transition diagrams and statecharts are the favored notations, and they are ideal for defining finite state machines. However, this is essentially coding when further analysis could be more appropriate.

Scenarios depict the sequence of messages sent between objects. This can be used to get a better understanding of which objects participate in a given situation, threads of control, bottlenecks, and other information. A composite of several scenarios can be constructed which gives a summary of all the messages being sent. This can then be used to consolidate a set of methods for the recipient classes. Scenarios can be used as an aid towards the construction of the objects and methods of the OO object model and also used as an aid towards the development of the state transition tables of individual objects.

Scenarios are also useful for defining and describing software development and other business processes. Software development processes are often designed using a process model. These process models are described using design notations similar to those used for designing software systems (e.g., dataflow diagrams). As is often the case with software systems design, the software process models can also become very complex, with multiple levels of abstraction. Scenarios can be used to illustrate and focus on certain key aspects of interest of the software development process model. For example, improvements or optimizations may be desired only within a particular phase of the process.

Scenarios are also useful when process tailoring is done. In this case, certain steps within the defined process for a software development organization may be removed or new steps added as required for a specific project. Scenarios could be defined to illustrate only those steps of the process model to be used for the project. Steps not being used by the project can be hidden from view by excluding them from the project specific process scenario.

In addition to software processes, business processes can also benefit from scenario definition. This activity is sometimes referred to as "business process reengineering." A business process reengineer might ask the question, "What are the steps currently required to process a purchase order, how long does it take, and can this be done in a more efficient way?" A scenario can then be defined to illustrate the current approach to purchase order processing, and scenarios can also be defined for candidate alternate approaches. The business process reengineers can then focus on improving the lag time associated with purchase order processing, and not be concerned with the details of other business functions such as payroll or human resources management.

In accordance with the present invention, a scenario tool prototype has been developed for defining and animating scenarios for both structured and object-oriented methods. FIG. 3-1 shows a number of windows from this prototype tool which supports the definition, maintenance, and animation of scenarios For a initial overview, FIG. 1 shows File Relationships.

1. A scenario may reference any number of sound files.
2. Sounds can alternatively be encapsulated within scenario file thereby eliminating the need for external files.
3. An SASD scenario refers either to a model within a Teamwork repository and the diagrams within that model.
4. CDIF files may be manually loaded if the Teamwork repository is not available.
5. An OO scenario refers to an OO Model file.

FIG. 2 shows Scenario File Structure and Definition

A scenario file comprises the following parts:
A scenario file comprises the following parts:
1. Header
scenario name
filename
version
description
methodology
viewform
initial state
soundfile
2. Diagram Information For SASD:
model
diagram ids
diagram names
elements
element types
positions
sizes
names
instance numbers
ids
flow direction
For OO:
model
column information (MSC) is saved in the order it was last displayed
column names
column positions
rows are saved as flows in sequence from top to bottom
names
positions
directions
source
destination
3. Step List
diagram
source node id
flow id
destination node id
value
description
state
state scope
soundfile
4. Requirements List
name
description 5. Column List
diagram
node
OCD File Structure and Definition
1. Header
2. Scenario list
3. Diagram information
Sequences of Activity
1. Load a scenario
2. Load a diagram
3. Animate a scenario
4. Animate a step
5. Load an Object Communication Diagram (OCD)
6. Create a Message Sequence Chart
7. Create an Object Communication Diagram
8. Save a Scenario
9. Write scenario file
10. Save an Object Communication Diagram
11. Exit scenario tool
12. Display DFD
13. Decorate DFD
14. Perform Animation
15. Display OCD
16. Display scenario
State Transitions
1. DFD step definition
2. MSC step definition for SASD
3. MSC step definition for OO
4. Modes The OCD file comprises a header, a scenario list, and diagram information. The header represents the name of the OCD file with version information, if applicable. The scenario list is the list of scenarios that are participating in that OCD. The diagram information contains layout information on the user preferred placement for retrieval.

FIG. 3 illustrates schematically the elements of Scenario Tool Architecture.

Referring now to FIG. 4, for structured analysis support, a dataflow diagram is presented by the Scenario Tool. The source of the dataflow diagram can be any CASE tool that creates a compatible file, for example, in Common Data Interchange Format (CDIF). The current prototype has a programmatic interface to Cadre's Teamwork.

Scenarios in accordance with the present invention are defined by clicking on the nodes and arcs in the desired sequence. As the sequence is built up, the step numbers are displayed on the arcs. Each step of the sequence can be annotated with some descriptive text or voice, the value or message being transferred, and state change information. The scenario can be saved to a file and read back in.

At any point, the scenario can be animated. This means that the steps of the sequence are sequentially illustrated with highlighting and moving icons. The animation of a step is depicted in FIG. 5. It is noted that the step number has been highlighted and the value being sent is indicated in brackets below the name of the dataflow. Sound can also be provided. The entire scenario can be listed in a textual transcript form and saved to a file and/or printed.

For object-oriented analysis and support, scenarios can be displayed in the form of a Message Sequence Chart or Event Trace Diagram. A Message Sequence Chart is shown in FIG. 6. Communicating objects are named on the vertical lines and messages or method invocations are shown going between the vertical lines. Time increases from top to bottom. If Entity Relationship (ER) diagrams (Object Model) are available, they can be read in. Any defined class or method names are provided when defining the scenario. New names can also be entered.

The scenario can be redrawn in the form of an Object Communication Diagram or Event Flow Diagram as shown in FIG. 7. In this form, the nodes represent the communicating objects and the arcs show a summary of messages between them. Alternatively, the Object Communication Diagram form can display the objects with a set of methods made from the collection of messages received. Multiple scenarios can be built into a single composite diagram. A summary of messages and methods for each object and each pair of communicating objects is also available. Additionally, the Object Communication Diagram can be merged with the Object Model.

Regarding the interfacing to CASE tools, Scenario Driven Design and the Scenario Tool in accordance with the present invention are intended to augment existing design methods, not to replace them. Thus, a design goal for the Scenario Tool was the capability to interface with existing commercial CASE tools, which implement the popular software design methodologies. The Scenario Tool has been designed such that scenarios can be defined and animated using standard notations (e.g., dataflow diagrams). The interface to the Scenario Tool is the repository of design diagrams generated by existing CASE tools. These diagrams can be read into the Scenario Tool, and displayed such that the scenarios can be annotated and animated. The outputs of the Scenario Tool are the scenarios that describe the behavior of the system. The animation of the scenarios provides a capability for better communication of the scenarios for purposes of review and training. The Scenario Tool interface approach is illustrated in FIG. 8.

As regards the scenario tool interface approach. the Scenario Tool has been designed to be able to handle situations when the diagrams in the design repository have been modified. The scenarios are self-contained. They include sufficient information to be used even if the underlying design diagrams have been changed or deleted. Missing or renamed elements (called phantoms) are displayed with a contrasting color to make them stand out.

Figure 9:
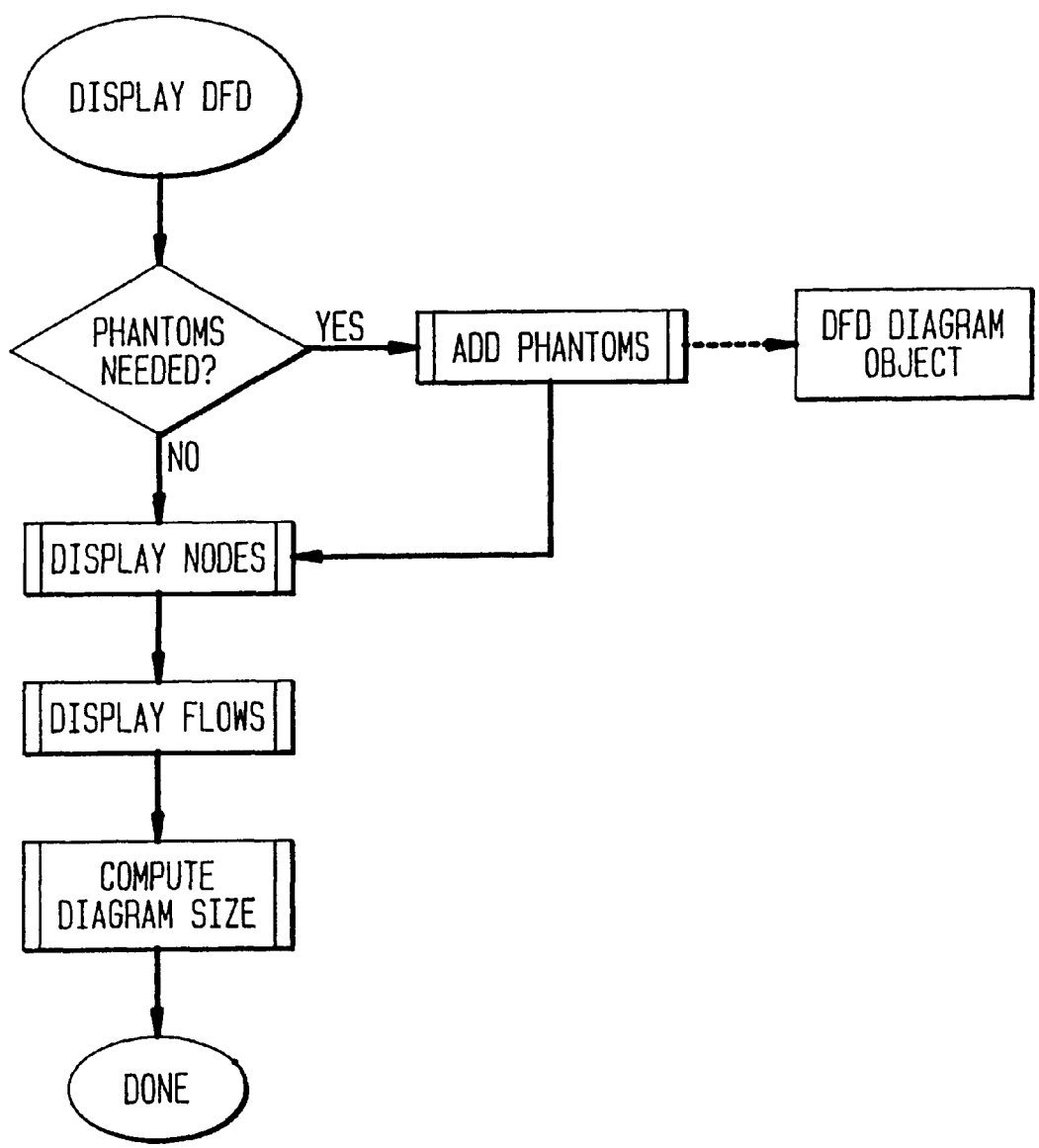
Figure 10:
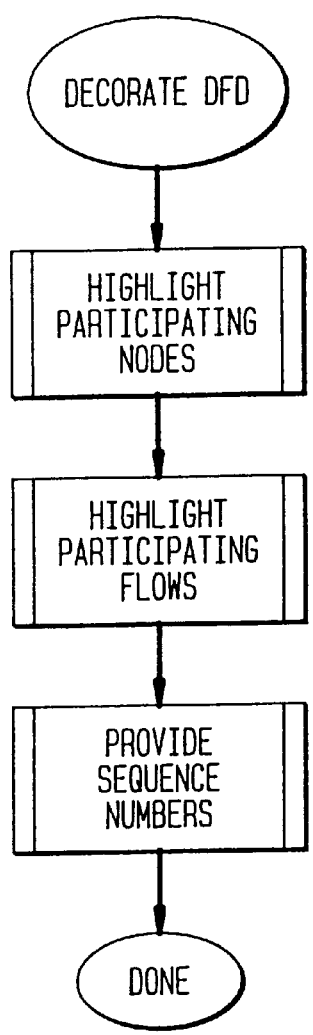

The top box of the chart of FIG. 9 indicates that a Data Flow Diagram (DFD) is to be displayed. The scenario tool in accordance with the invention supports structured analysis and object oriented analysis: Data Flow Diagrams are created in a CASE form, referring in the present embodiment to Teamwork by Cadre. File relationships are shown in FIG. 10, from which it is apparent that a scenario is a file which refers into the teamwork repository box on the right of FIG. 10. The teamwork repository box contains a box labelled OO Model which, in turn, contains a box labelled Diagrams. Thus, the scenario tool has the ability to extract from the teamwork repository a list of models and a list of diagrams within each model that the user has created using Teamwork. The choice within the scenario tool is to read the model and diagrams directly from the repository into the scenario tool, as files to be read later directly from the file.

Returning to FIG. 9, DFD can be parsed directly from the file or from the dumped items from the repository, which are already in the memory of the scenario tool. In the representation of a diagram object, the elements of the diagram are the nodes and the flows that represent the diagram. The decision box as to whether phantoms are needed provides a check as to whether the diagram has been changed since the scenario was created. There is thereby provided an opportunity at this point to indicate to the user that the scenario might be out of date with the diagram. The diagram is in a separate tool and may be modified, as happens in any case during the design. The possibility is guarded against that one could be working with an incorrect diagram by detecting missing elements, whether items been moved around or renamed, and so forth.

As was previously noted, a phantom is a missing element. A diagram can have been completely deleted but the scenario tool contains enough information to reproduce the parts of the diagram as needed. Furthermore, a phantom can also be an object that is not missing, but is present and represented, such as an object that might have been changed to a different type from that which might be needed. Therefore such objects are presented in a contrasting color so that the user knows that their scenario should be modified. This is an aspect that is unique to the present invention.

Thus, dating the phantoms means taking from the memory of the scenario, which is a file, any missing elements and placing them on the display or into the diagram that is needed to be displayed. The box on the right in FIG. 9 called DFD diagram object which is an internal representation of the diagram in the memory, being an object-oriented representation of the diagram.

When it has been determined that no phantoms are needed or any necessary phantoms have been added, the modes of the diagram then displayed, being the terms, processes, C specifications, and the storers. Thereafter, all of the flows are displayed, which are all the lines interconnecting and the diagram size is computed. This is important for scrolling purposes.

At this point, the Data Flow Diagram (DFD) is displayed as complete. All of the modes and the flows are on the screen and the size is known. This summarizes how a Data Flow Diagram gets onto the screen, displayed in form and with internal representation in memory.

Turning to FIG. 10, the top box, labelled Decorate DFD, is reached after the diagram has been placed on the screen. Decoration refers to an indication of which parts of the diagram are participating in the present scenario, for example, by indications using a different screen color.

First, all the participating modes are highlighted. Thereafter, all the participating flows are highlighted and sequence numbers are added to all the flows. These numbers indicate the sequence of the steps. This completes the step of decorating.

Figure 11:
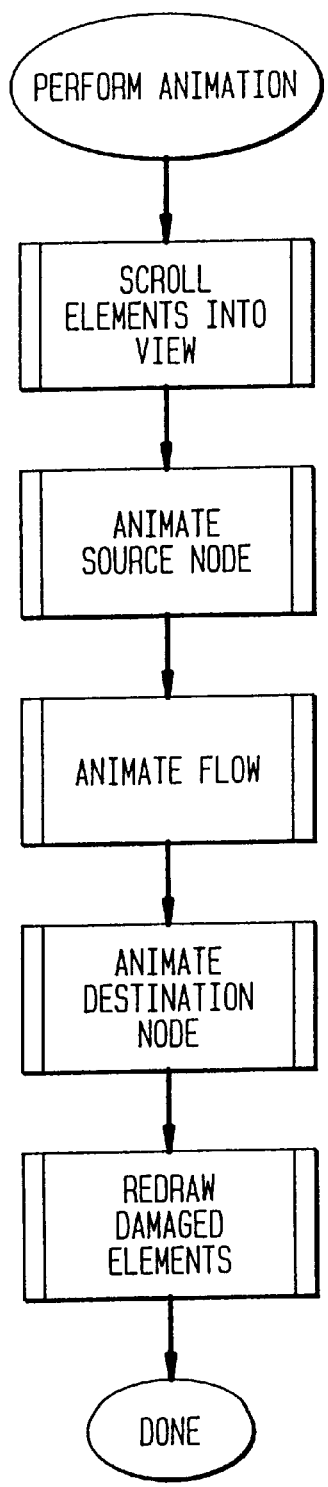

Referring to FIG. 11, the step of animation refers to a diagram that is on the screen and is already decorated. Animation refers to the graphical presentation in sequence of the participating elements of the diagram. Before any animation is started, it is necessary to check that the thing to be animated is visible on the screen. Because diagrams can be very large and they can be off screen, there can be practical problems of display.

Accordingly, scrolling is first carried out through that portion of the screen of diagrams into the view so that they can be animated. Then the source node is animated, for example, either by blinking or writing in some fashion. Then the flow is animated in some graphical way, for example, either by moving an icon along the flow or by graphically changing the color of the flow showing some movement. Clearly there exist many choices in implementing animation by using a variety of graphical techniques. Thereafter, the destination is animated in similar fashion.

During the process of animation, part of the diagram may have been damaged. Accordingly, after completion of the animation, a clean-up is performed by redrawing any damaged elements so as to reconstruct a proper-looking diagram. Accordingly a perfect representation is kept in storage.

Figure 12:
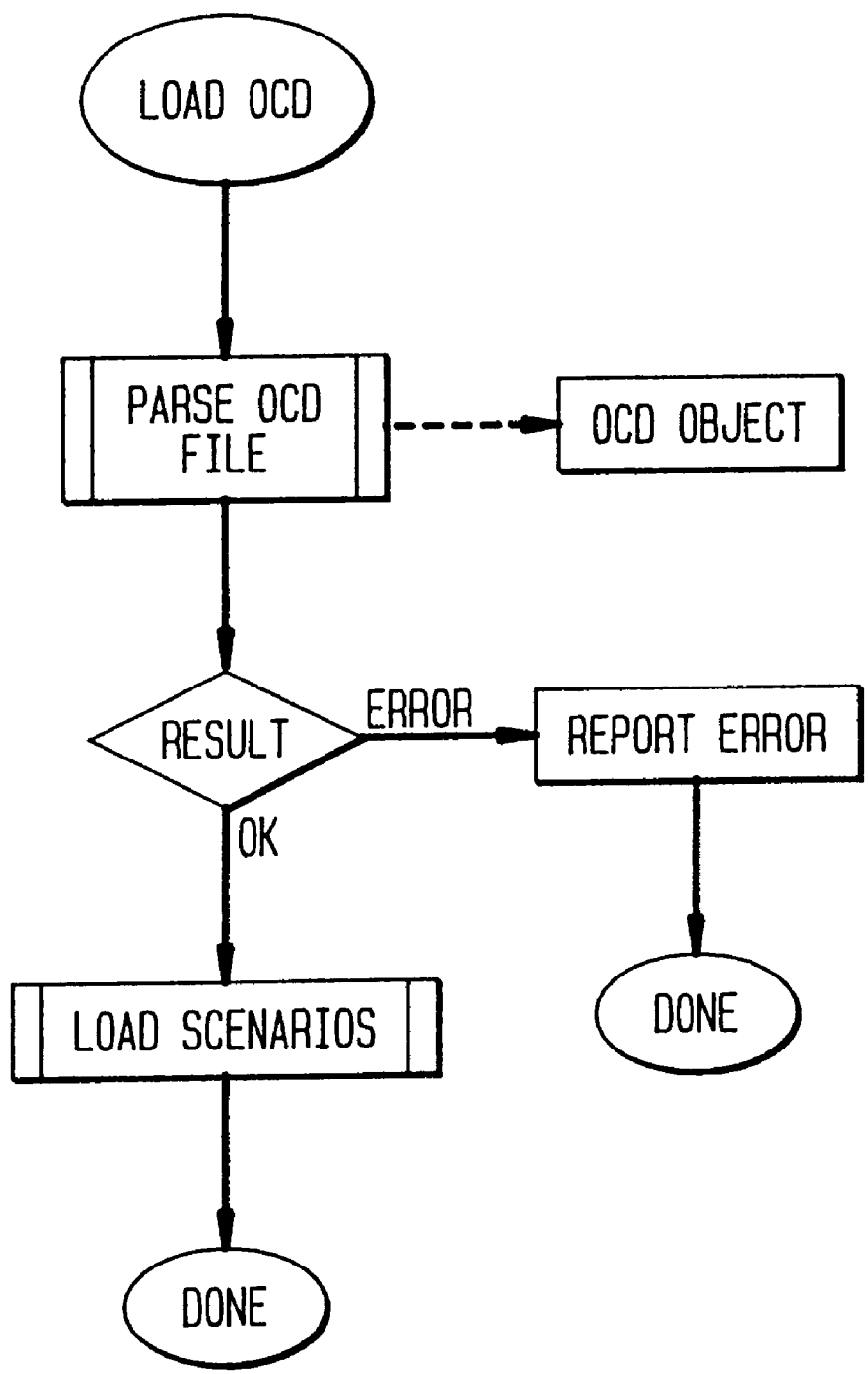

In FIG. 12, the top box represents loading the object communication diagram (OCD). This is another kind of file which is a collection of scenarios, being a composite file of multiple scenarios. It is noted that the scenarios themselves are not stored in the file—just the names of the scenarios are there. This represents a list of participating scenarios.

First, the OCD file is parsed and an OCD object is created in memory. Memory is allocated in structure form or object form in the store, representing this OCD object. The OCD object is like a list of scenarios. For each scenario in the OCD, that scenario is loaded—there is thus a separate term called load scenarios and each scenario gets loaded, as will be further described in conjunction with another flow chart.

A file nay not be correct or not in the correct format, as may happen as the result of tampering or editing. Thus there may be a grammar violation such that the file can no longer be used, so that it has to be parsed correctly. If the parse is unsuccessful, the file may have to be discarded. Assuming a correct parse is obtained, all of the scenarios associated with that OCD are then loaded in accordance with this subroutine.

Figure 13:
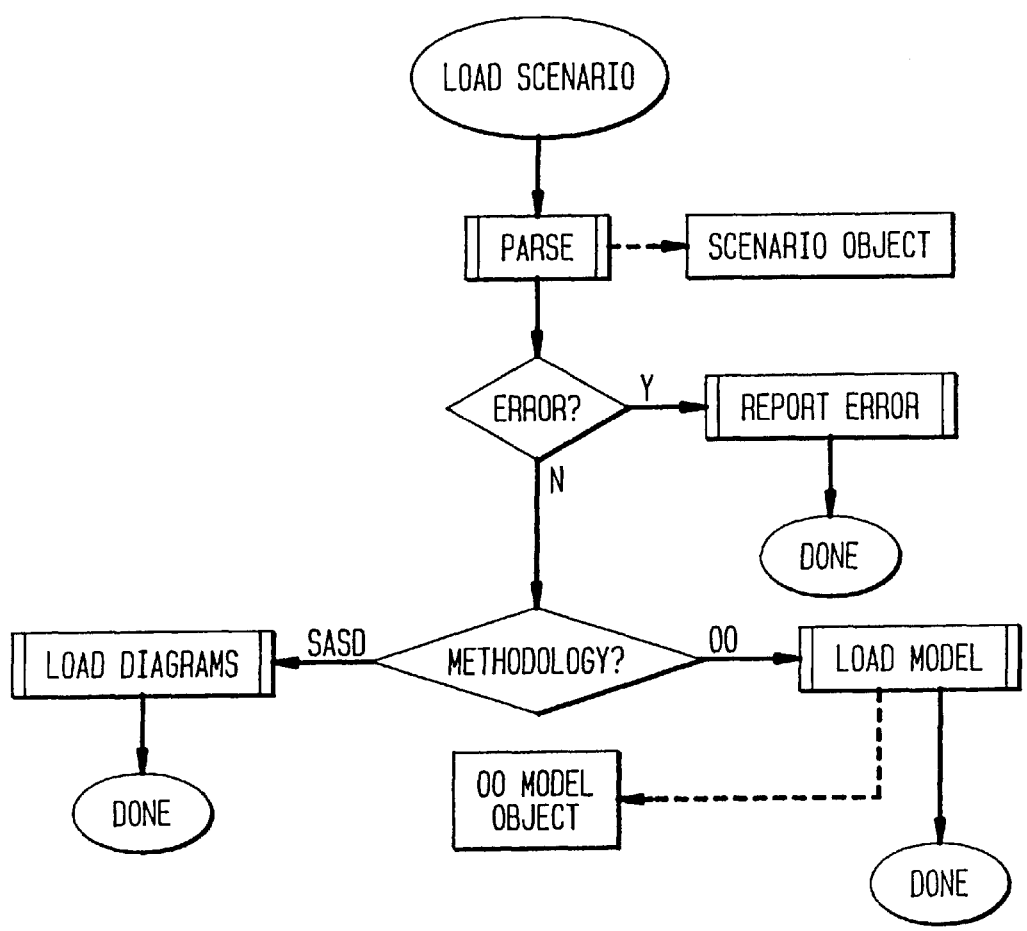
Figure 14:
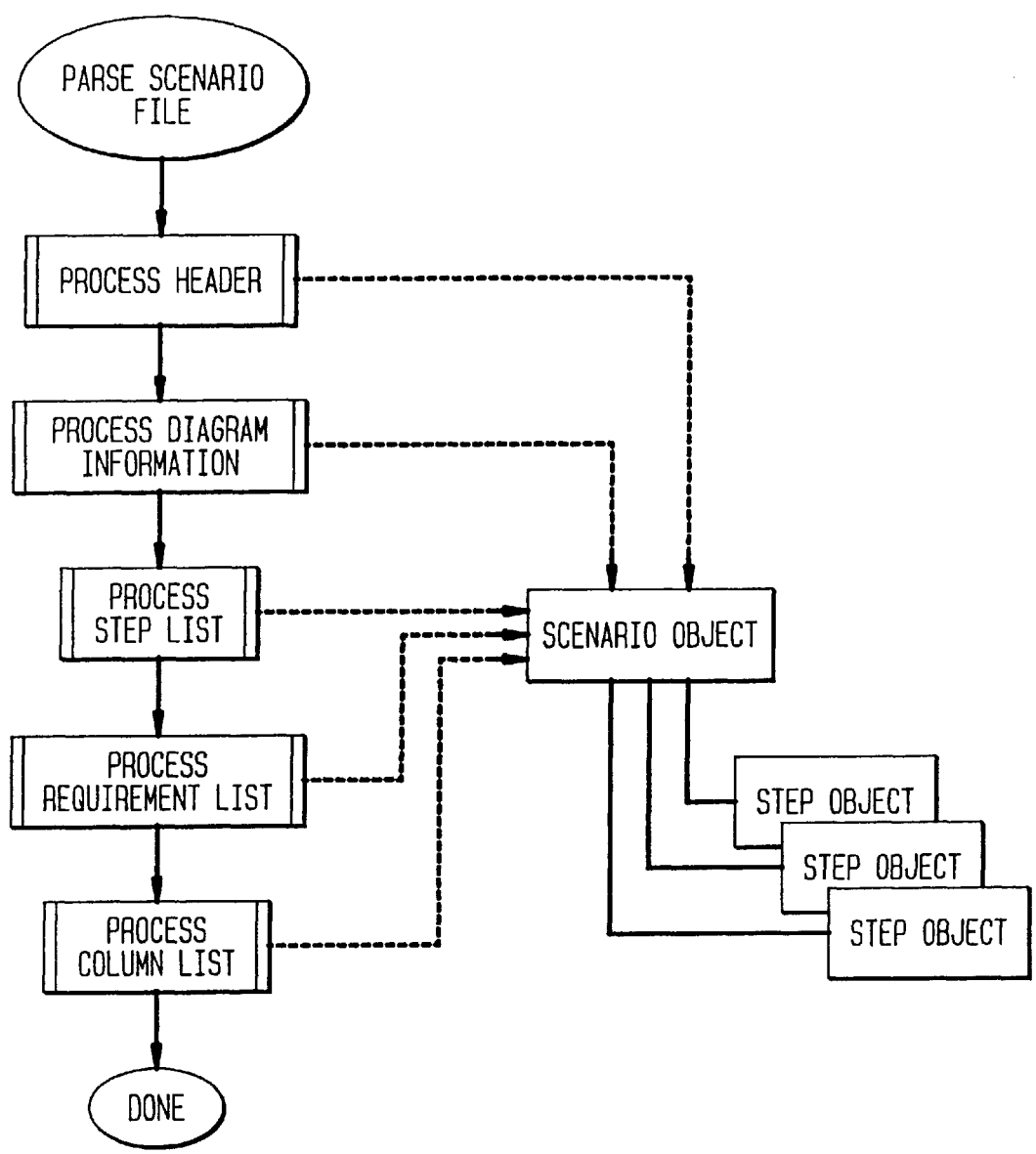

Referring now to FIG. 13, the top box is labelled represents Load Scenario. Just as with OCD, this must be parsed. The scenario is a file, so that it is parsed and a scenario object is created. See FIG. 14. If a bad parse is found, an error is reported. Assuming a good parse, the methodology of that scenario is then checked. It is either structured analysis/structured design (SASD) or object oriented (OO). If the methodology is SASD the data flow diagrams associated with it are loaded and that's an attempt to go to the teamwork repository and extract those diagrams and read them. If it is an OO scenario, the model that's named in the scenario is loaded. This is an OO model description of the system that is being worked with, and when this loading is carried out, an OO model object is created, just like each of the flow diagrams will create a diagram object.

Figure 15:
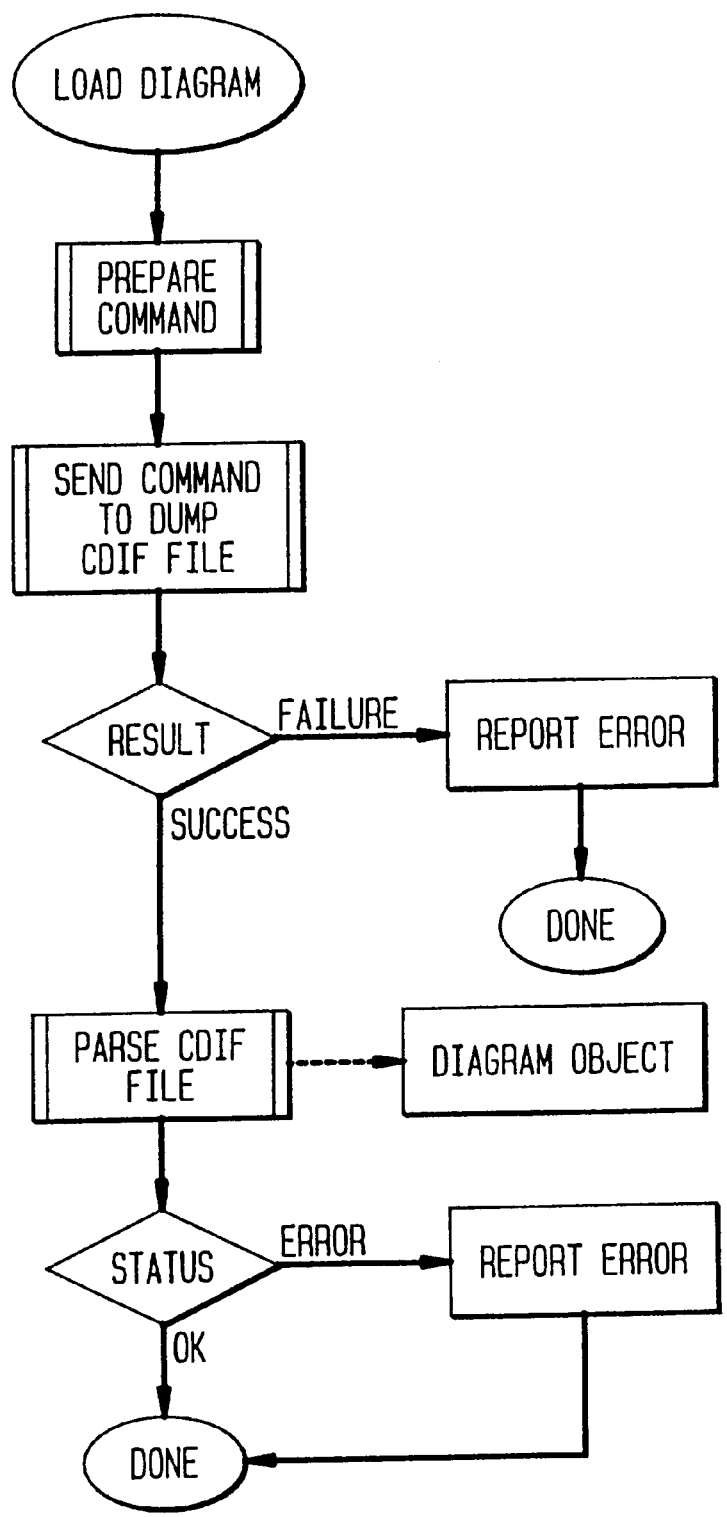

Referring now to FIG. 15, the top box represents Load Diagram. Loading a diagram refers to communicating with the Cadre Teamwork repository. This is a programmatic interface between scenario tool and a case tool repository, which is another piece of software. First a command is prepared to be sent out and then the command is sent in the second step. That command tells what needs to be dumped in a CDIF file, which model and which diagrams. A failure might occur for one of many reasons such as the network not working properly or the diagram does not exist, or otherwise. Assuming success, CDIF file returned which is then parsed. This is a description of a diagram or a number of diagrams. And for each diagram parsed out of the CDIF file a diagram object is created in memory in the store. For each parse performed, a number of CDIF files may be returned and a status report is obtained, an error being reported for all the bad files. Thus, loading a diagram is taking it and putting it in memory.

Figure 16:
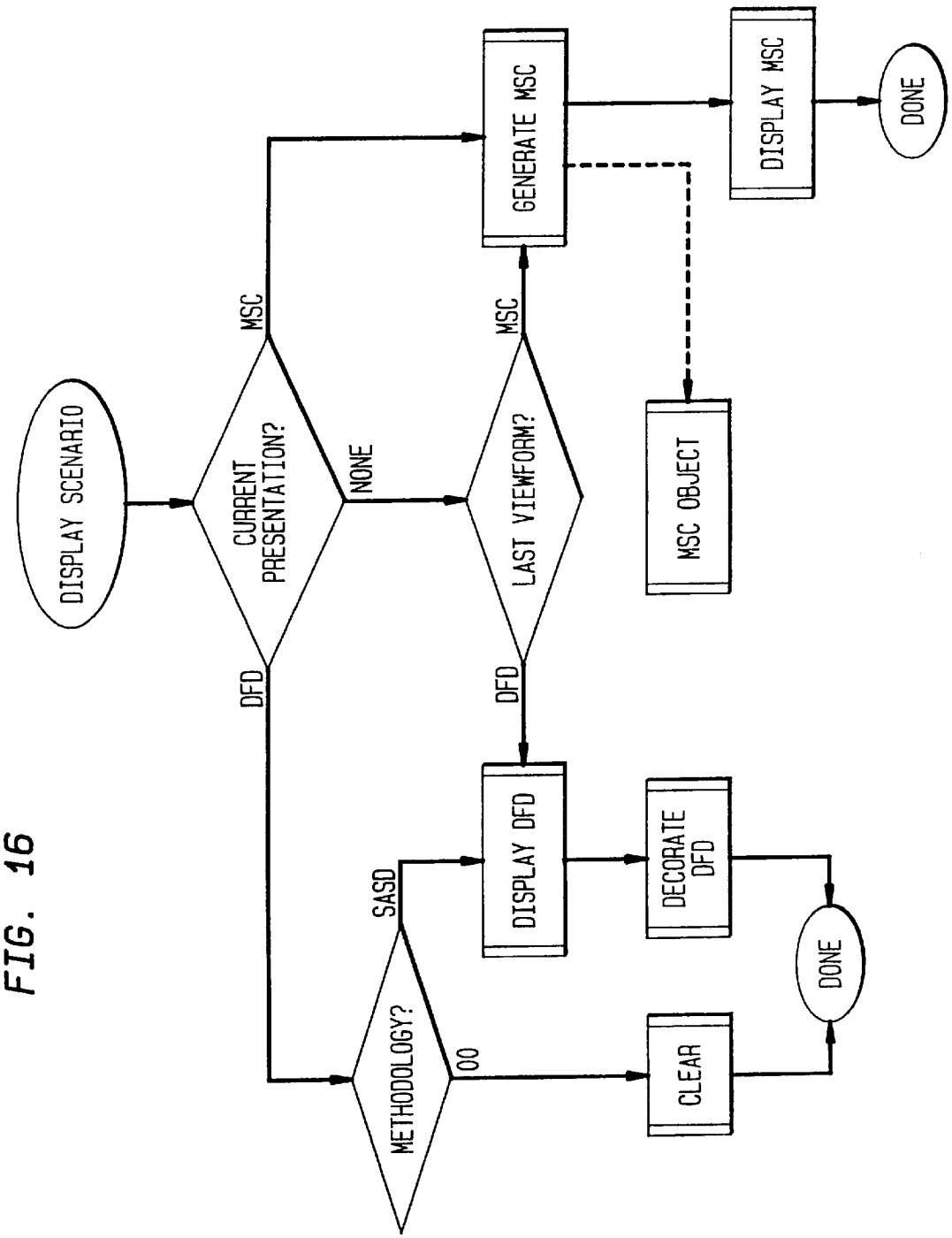

Referring now to FIG. 16, the top box represents Display Scenario. Display scenario is concerned with putting on the screen the representation of the selected scenario. First, a check is made to see what is the current presentation. At start-up, there is no current presentation, and a decision is made based on the contents of the file as to what was the last view form of the scenario. There is a choice of either DFD or MSC. These are unique presentations within the scenario tool in accordance with the present invention. DFD requests the Data Flow Diagram view, MSC is Message Sequence Chart. The MSC decision is made if this is the initial viewing with nothing else on the screen. If there is a current presentation, it is either Data Flow Diagram or of Message Sequence Chart. Those two paths will next be followed. If currently in Data Flow Diagram, the methodology of the incoming scenario is examined—the one that you is being displayed. If it is structured analysis, the first diagram required by that scenario is displayed, because there may be a number of diagrams associated with the scenario; however, the first one means that it is the one containing step one for that scenario. That diagram will be displayed.

If it is an OO scenario and the data flow diagram display is the present display, the screen is cleared because there is no representation to be shown. The rest of this is clear. So if a data flow diagram is being shown, the first diagram needed is first shown and then it is decorated. Decorating has been described as showing the scenario on the diagram.

If, on the other hand, the current presentation is message sequence chart, a message sequence chart is generated based on the scenario. What this means is that the sequence of steps of the scenario is built into a message sequence chart object in memory, and that represents the scenario in memory and then the message sequence chart is displayed on the screen. Thus, in either case these identical diagrams will be shown or a message sequence chart based on what the current presentation is, and in some particular case screen may be cleared because it has nothing to show. This may occur if the scenario read in happens to be a OO scenario, meaning there are only diagrams associated with it. It requires an 0 model for its representation, so there is no diagram to depict. So a random diagram is not shown. While it is a model; however, there is no representation to be shown in the data flow view and it is just cleared since it would be confusing, having no relationship to the scenario. In effect it should be looked at in the message sequence chart view where it is available.

Figure 17:
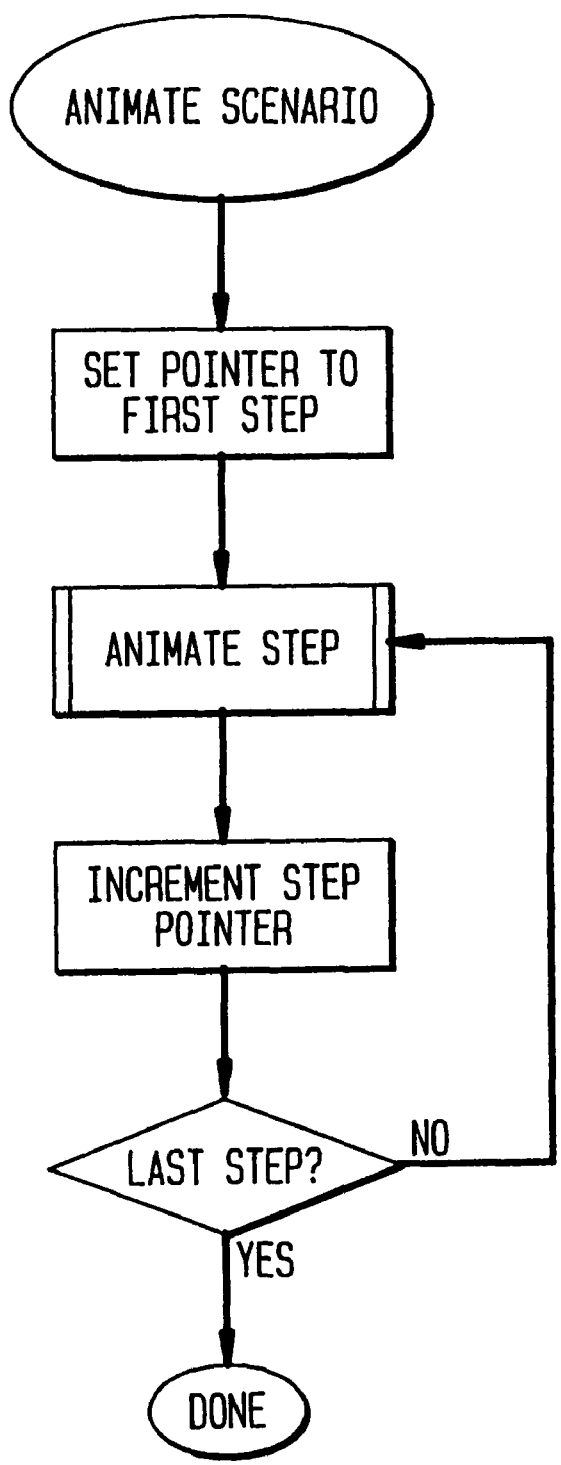

Referring now to FIG. 17, the top box represents Animate Scenario. When a scenario is loaded, it can be animated in single step fashion or it can be run completely through all the steps. When the scenario is first animated, the pointer is set to the first step, that step is animated, then following the animation of the step, the pointer is incremented and a check is then made for the last step. While this portion of the procedure is relatively straightforward, an important procedure here is Animate Step, shown in FIG. 18. Animation can be made to occur in single steps subject to user control or in a continuous mode. It is also possible to display the scenario as a message sequence chart.

Animate step goes through the animation of a single step and animation will occur either on the Data Flow Diagram view or the OCD view. First the completion of previous step's completion is awaited. There may be, for example, some animation or some sound being played related to the previous step and if that is the case, the system must wait until the previous activity has ended. It is also necessary to make sure the proper diagram is displayed for the animation to occur. If it is currently being displayed, the previous step information is cleared. That means that the highlighting and the animation of the previous step has to be deleted so that highlighting the current step can be implemented. A check is made as to whether there is any voice annotation for this step. If there is, voice annotation is initiated by spawning a separate process which plays this annotation separately in parallel. The animation for this step is then performed, whether or not there is sound. See FIG. 11. The sound plays to completion. Play sound; exit may be one of the items awaited for the beginning of the next step.

Figure 18:
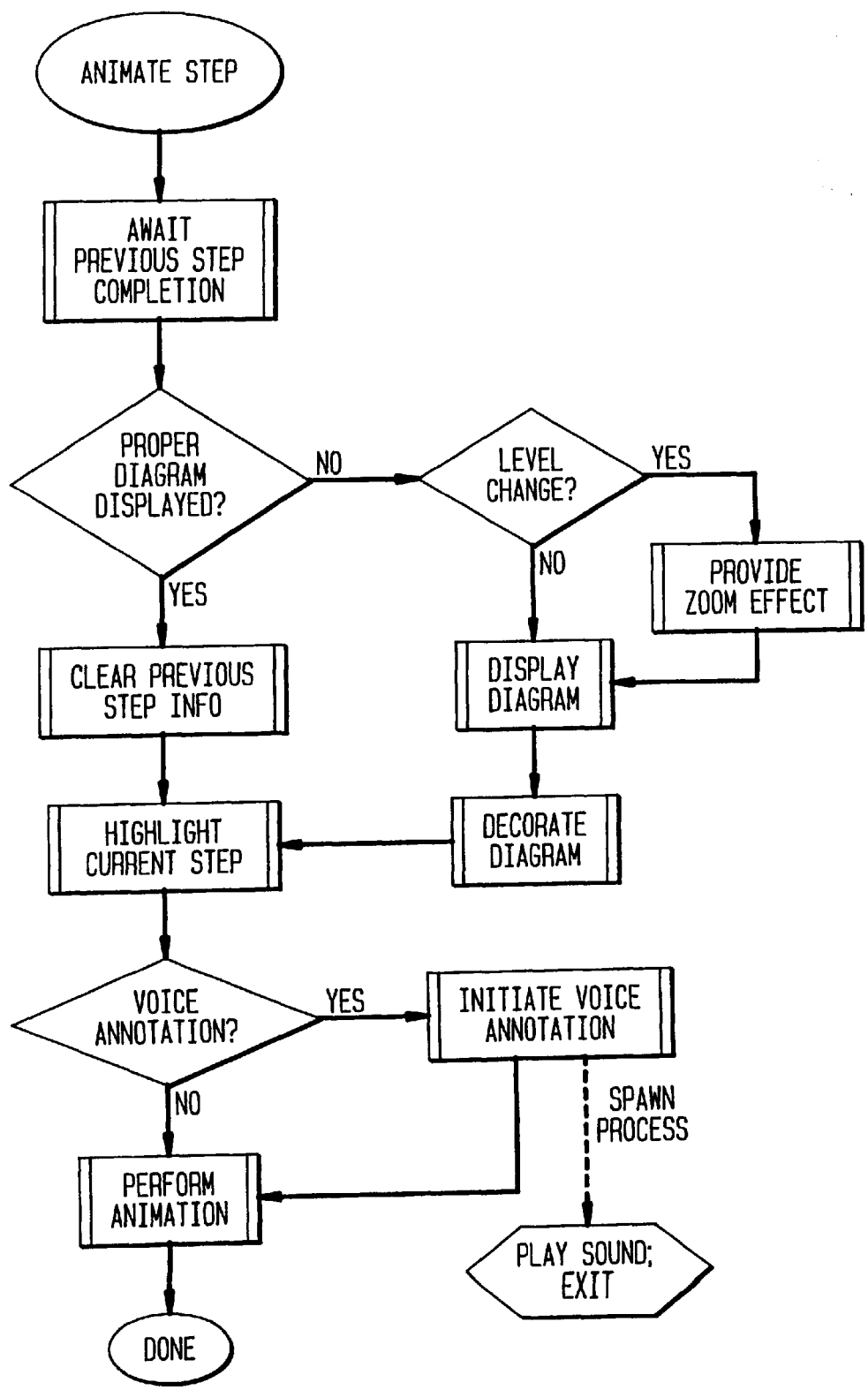

Referring now to the box near the top of FIG. 18, Proper diagram displayed ?, if the proper diagram is not displayed, then it is necessary to decide if a level change is to be made. In the data for the diagram, there may be a hierarchy change: it may go up to the parent level or down to the child level. If there is a level change, there is preferably provision for zooming: zooming down to the children or zooming up to the parent. Since the method in accordance with an aspect of the present invention is a graphical animation technique, a certain feeling of how the material is examined is thereby created. Then the diagram is decorated and the current step on that diagram is highlighted.

Figure 19:
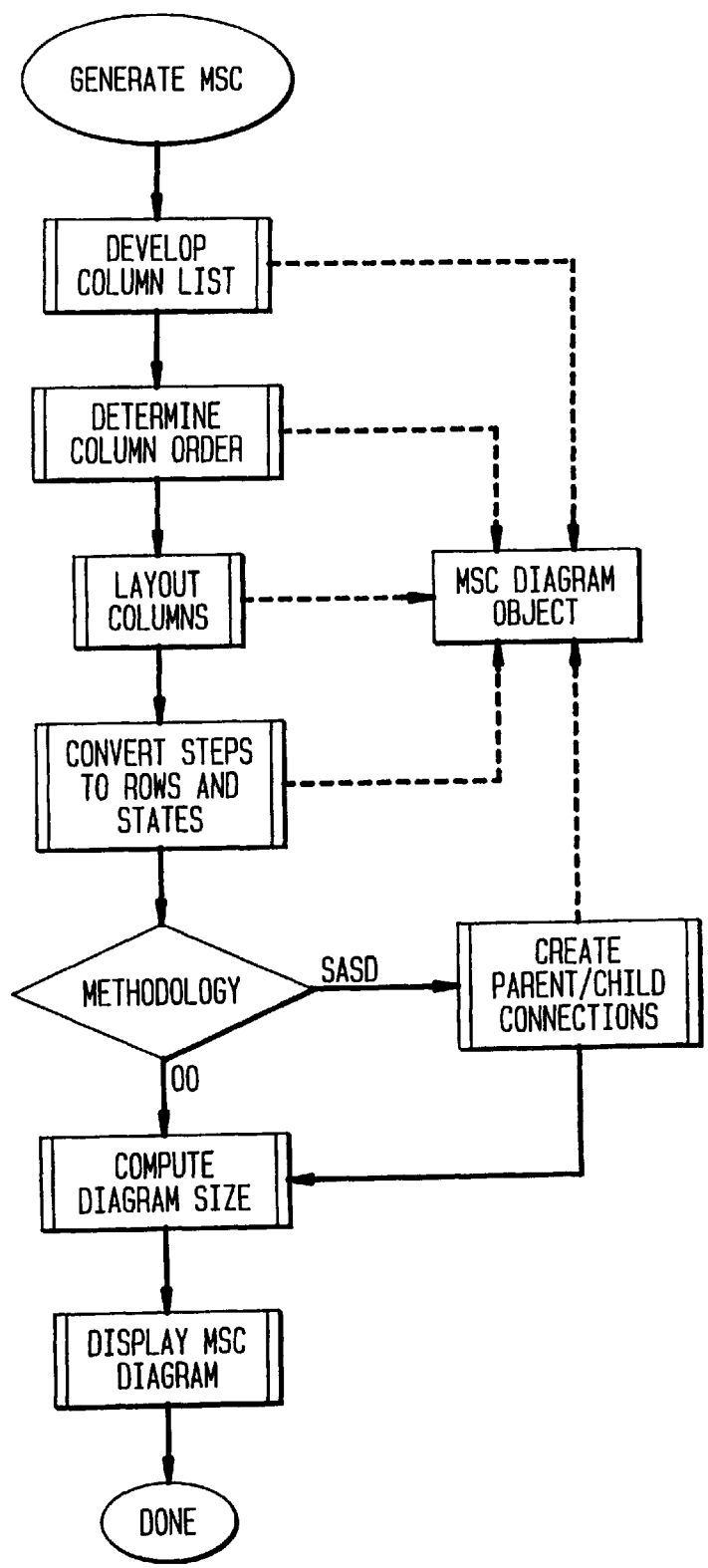

Referring now to FIG. 19, the top box represents Generate Message Sequence Chart (MSC), that is, generating a message sequence chart from a scenario. Essentially the MSC diagram object is being developed in memory in a series of steps. First a column list is developed and a determination is made as to what are the participating modes of this scenario. The column list is derived either from the data flow diagram or from the steps of the scenario. Then the column order is determined because the list of steps may end up giving a wrong order and the order of these steps is allowed to be changed. If an adjustment is needed, a step is selected and moved around. So the order in which they were last saved is more important than the order derived from the recent steps. There is thus provided in the method in accordance with an aspect of the present invention a feature in the scenario what was the last list of columns, that is the one with which an overide of the layout is desired.

The columns are then laid out. If only the list of steps is considered, a list of columns can be arrived at by just looking at what is the first source, what is the first destination, and what is the second source, what is the second destination, and that will provide some ordering of the columns. But that may not be the ordering that the user wants—with the ability to override the column ordering by manipulation, the view can be edited. Such a feature is more important than the derived view, that is, the view arrived at from the order of the steps. While such an order might be considered natural, it may seem quite unnatural to another viewer. Thus, in accordance with an aspect of the present invention, the ability is provided the user to manipulate the order to what is preferable to the user and thereafter to save the edited version. Accordingly, the columns are laid out according to the last saved order that they were in.

Thereafter, the steps are converted to rows and states. The rows are the horizontal lines and the states are the green state indications. All of that information is saved in the diagram object in the message sequence chart.

The methodology is then checked. What has so far been described is independent of the methodology so that the scenario can be shown either as a data flow diagram or as a message sequence chart, which has not so far mattered. If it is structural analysis, an indication is provided on the message sequence chart showing any parent/child relationships: that is done with a dotted line indicating that this node is an off page connector to the parent. Thus, all the off page connectors on the diagrams represent parent/child connections. That is the formal definition of what the identical diagrams mean and it is provided as an option that can be cancelled. The feature can thus be turned off, showing that the diagrams are actually disjoint in the hierarchy; there can be, for example, three levels. However, without the dotted lines, it is hard to tell that an off page connector is actually coming from a given parent.

As an optional feature in accordance with an aspect of the present invention, the ability is provided to see that off page guides do come from parent levels and when such an off page guide is sent out to an off page it goes to that level, so that it is unambiguous in this manner, which would be difficult for the user to ascertain that clearly in their mind. The diagram is at this point available in its computed size and finally is displayed.

Figure 20:
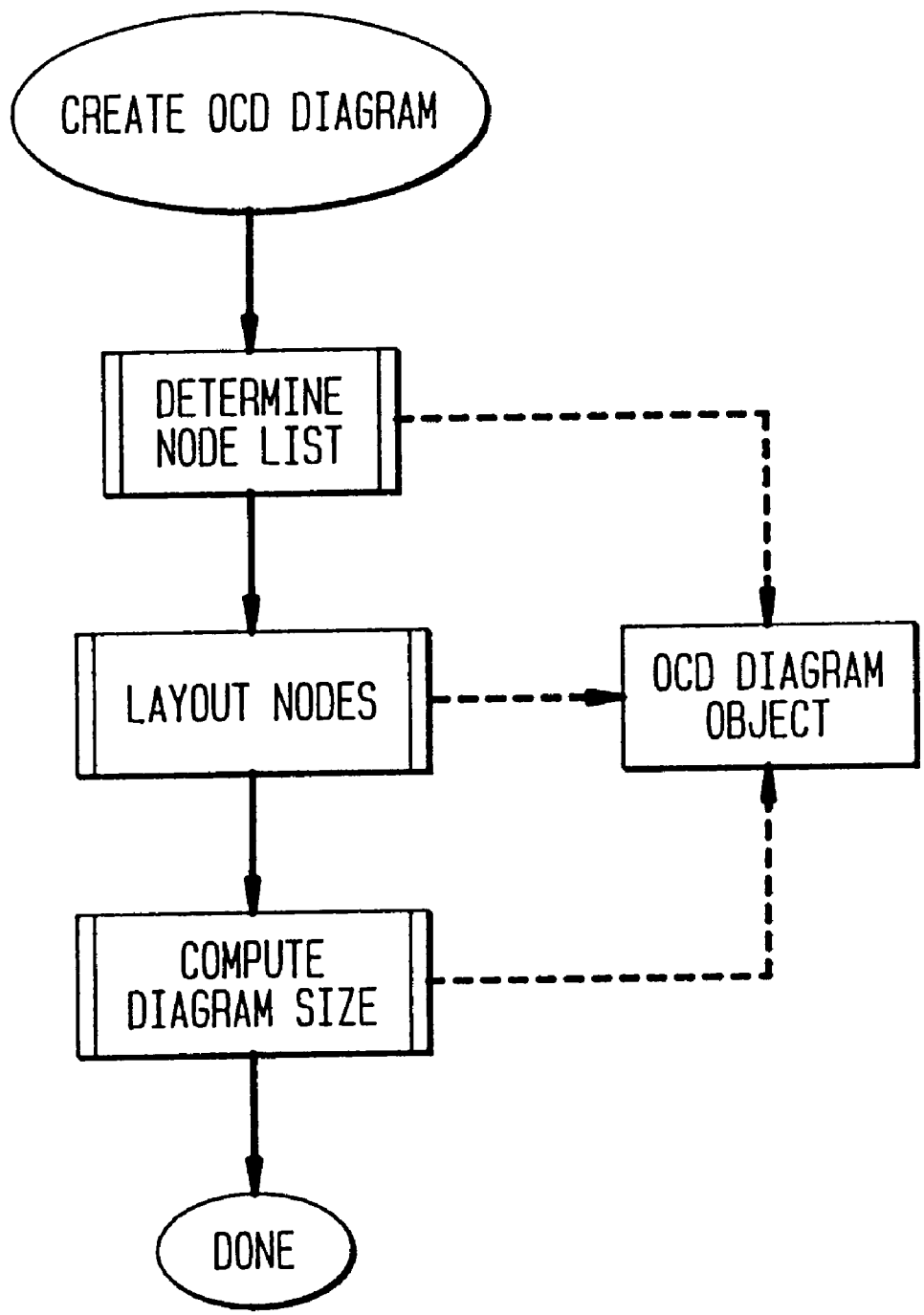
Figure 21:
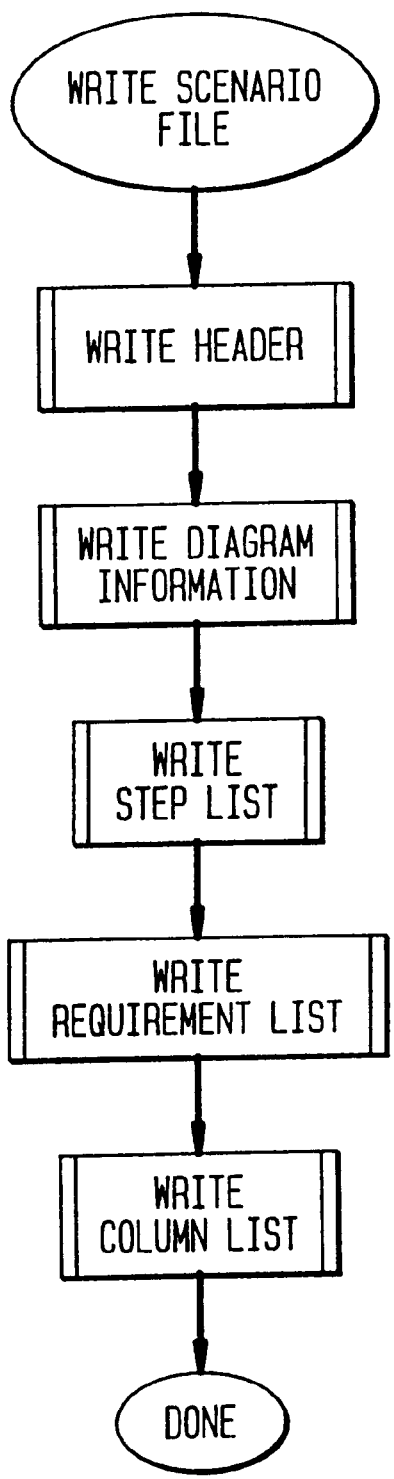
Figure 22:
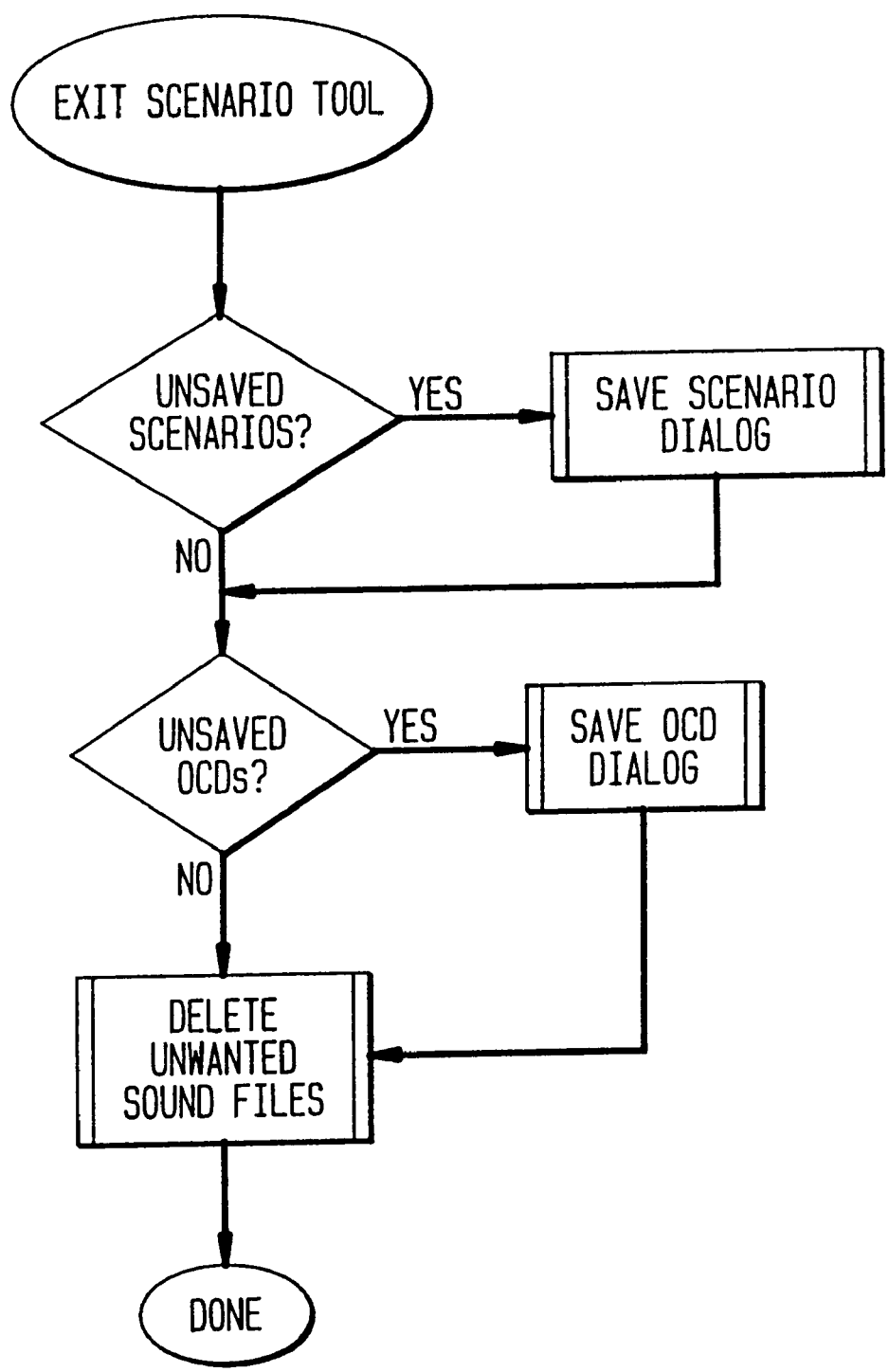

In FIG. 20, the top box represents Object communication diagram (Create OCD). First, an object communication diagram is created, that is, an OCB diagram object that comes from the OCD is instantiated. The diagram is then displayed an decorated, using the same concept as for a data flow diagram.

In order to parse a scenario file, it has to be broken up into pieces when it is read in, and there is a definition of what this file is in this first document. See FIG. 21. It describes the scenario file as having a header, some diagram information, a step list, a requirements list and a column list so those five sections of the file are parsed in one parsing. So the header information, the diagram information, the step list, the requirements list and the columns list are processed. All of that is built up into a scenario object. The scenario object comprises information about the scenario and also has a list of steps associated with it. Each of the steps has an object of its own. This is essentially the description of parsing a scenario.

In order to exit the scenario a request to exit may be entered, and the system protects the user against losing information. If there are any unsaved scenarios, a dialogue comes up in accordance with an aspect of the present invention and reminds each individual and asks whether the scenario is to be saved or not. The same is done for OCD's as regards whether they are to be saved or discarded. If, in the course of editing a scenario, an indication was made that some sound files need to be removed, they are not deleted until just before exiting in order that the files are lost. See FIG. 22.

Figure 23:
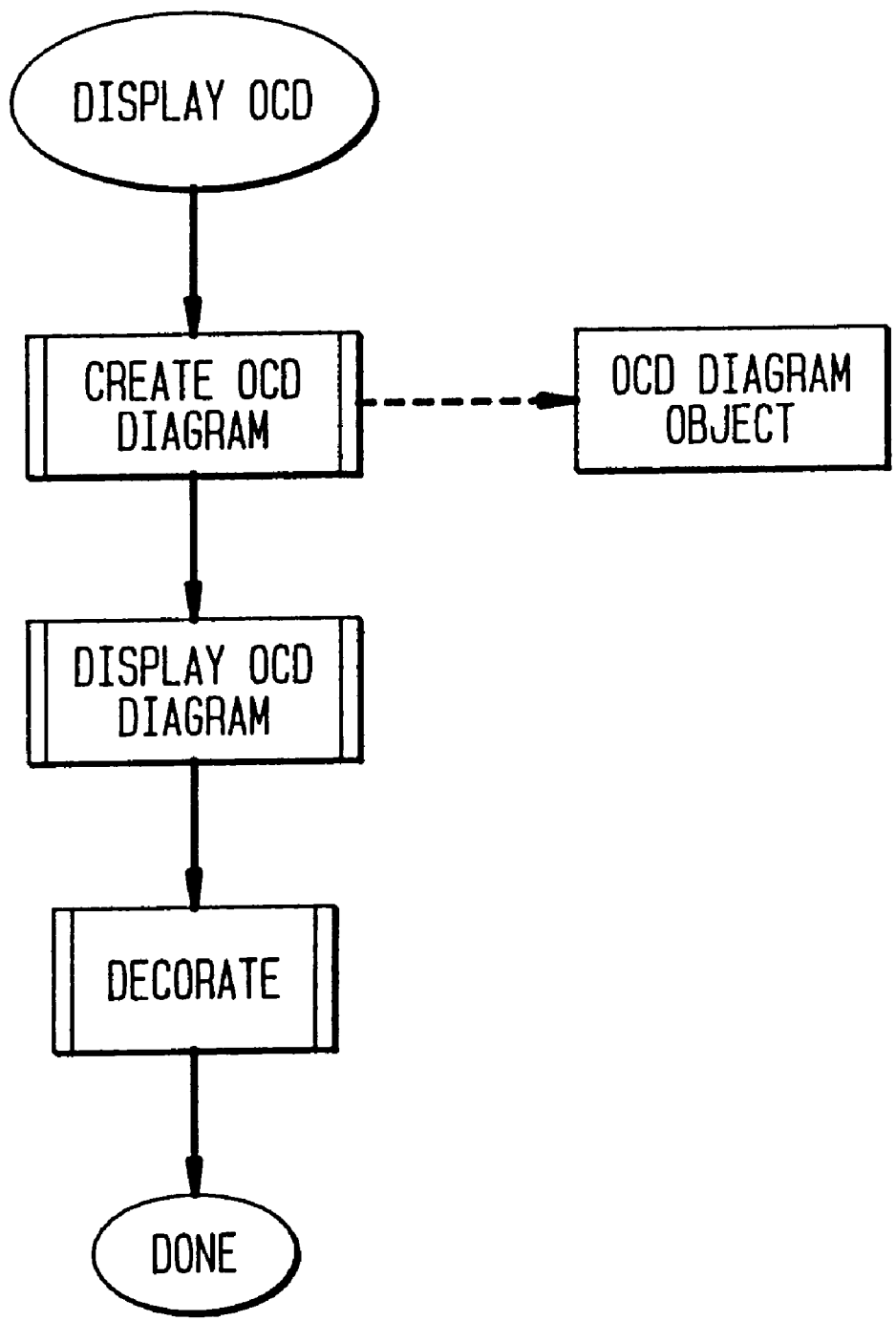

In FIG. 23, the top box represents Display Object Communication Data (Display OCD). In order to display an OCD an OCD diagram must be created which ends up actually instantiating an OCD diagram object. That OCD diagram is then displayed and decorated just like a data flow diagram. To save the scenario, it is whited out by creating those five portions that are described in the format for the file. First, the following are written: a header, a block, the diagram information, the step list, the requirements list and the column list, all being done into a single file.

To create an OCD diagram, first the node list of the participants is determined and, in order to build up an OCD diagram object, an automatic layout of the nodes in a circle is done. In this manner, there is very little line crossing, so that something like a distribution results. Then the diagram size is computed, so the concept here is that the laying out of a diagram is simplified by choosing the circle form and distributing nodes around the circle then interconnecting the nodes, which creates the diagram object.

To decorate a data flow diagram you the participating nodes on the diagram are highlighted. The participating flows are then highlighted and the sequence numbers on the flows are provided.

Figure 24:
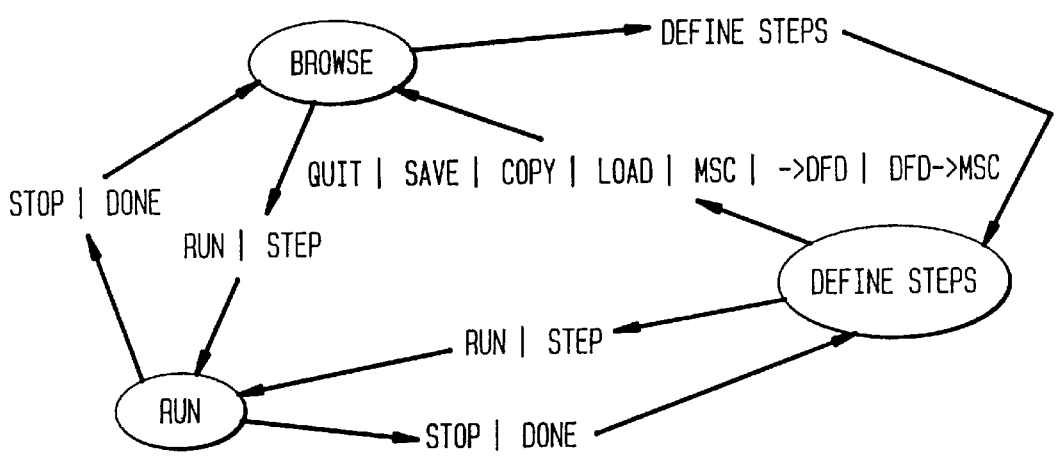

FIG. 24 shows a state machine in accordance with an aspect of the present invention, indicating the nodes from a user's point of view. When the scenario or diagram is first loaded in, essentially one can browse through the levels of the diagrams and just look at situation without doing anything. If a scenario is loaded the user can transition to the run mode and can either step it or run it through. The run mode is a form of sub-state of browsing. Nothing is being changed—it is just being animated. Running can be stopped or it can run to completion.

If the user goes into defining steps mode from browse mode new steps are being defined, but the user has not necessarily left browse mode, it is also a substate of browse mode. The user can edit and/or animate in this mode.

Furthermore, the user can even go into one mode while in the planning steps. In the define steps mode, the user can be defining steps and at any point can still browse. It is not necessary to continue defining steps, the user can pause from defining steps, and go deeper or go higher up in the hierarchy, or can even switch It is also possible herein to run and as steps are defined, they can be animated. It is not necessary to leave the define steps mode for these functions.

Figure 25:
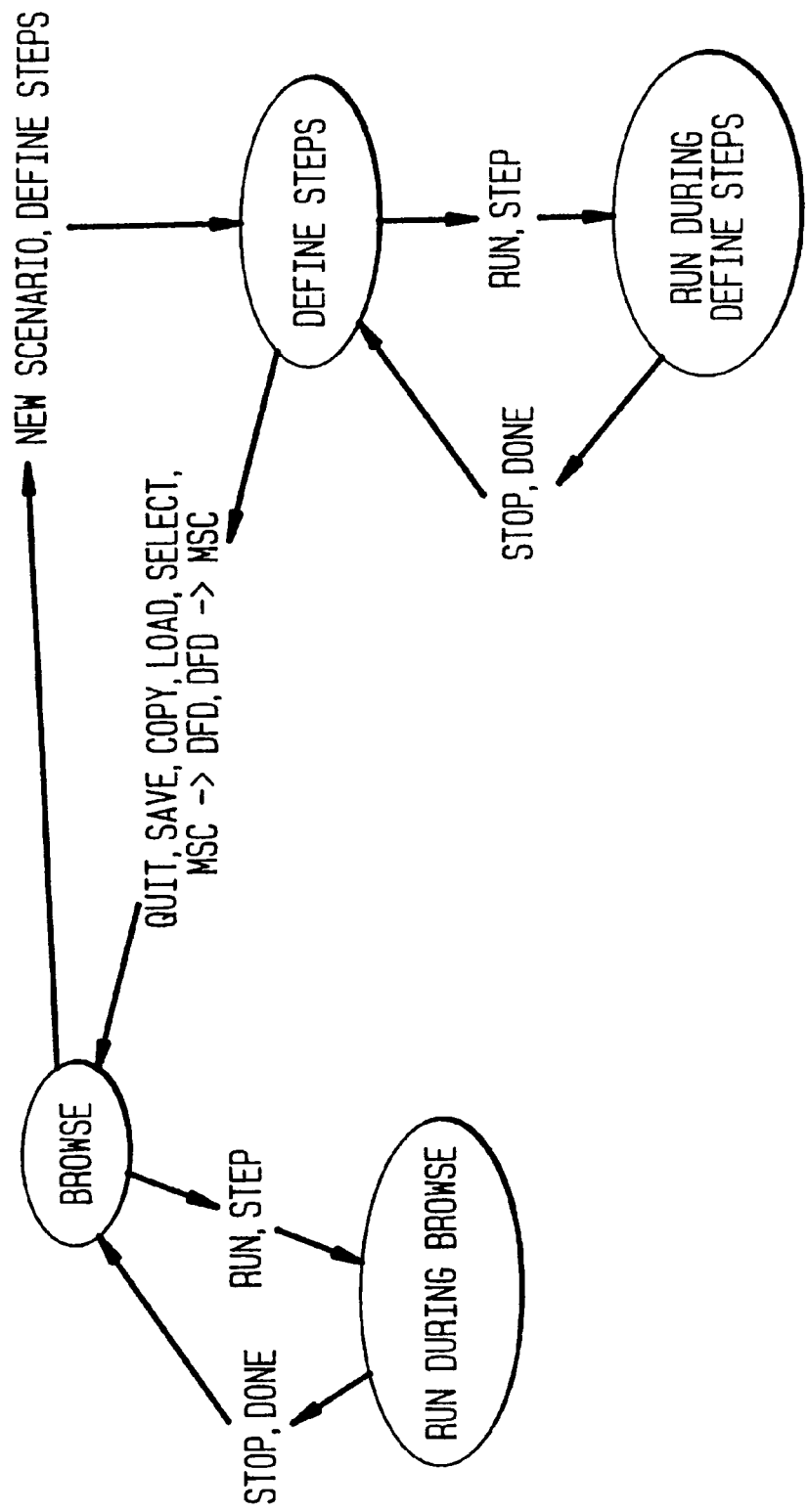

The state machine of FIG. 25 also shows system modes. It shows how the user can be in browse mode and can go down to running during while browsing and go back. Furthermore, the user can go into the define steps mode and then from there can fall into the run mode during define steps. It makes it clearer in a graphical way how a step is defined when the user is on a message sequence chart and defining a step with structured analysis.

Figure 26:
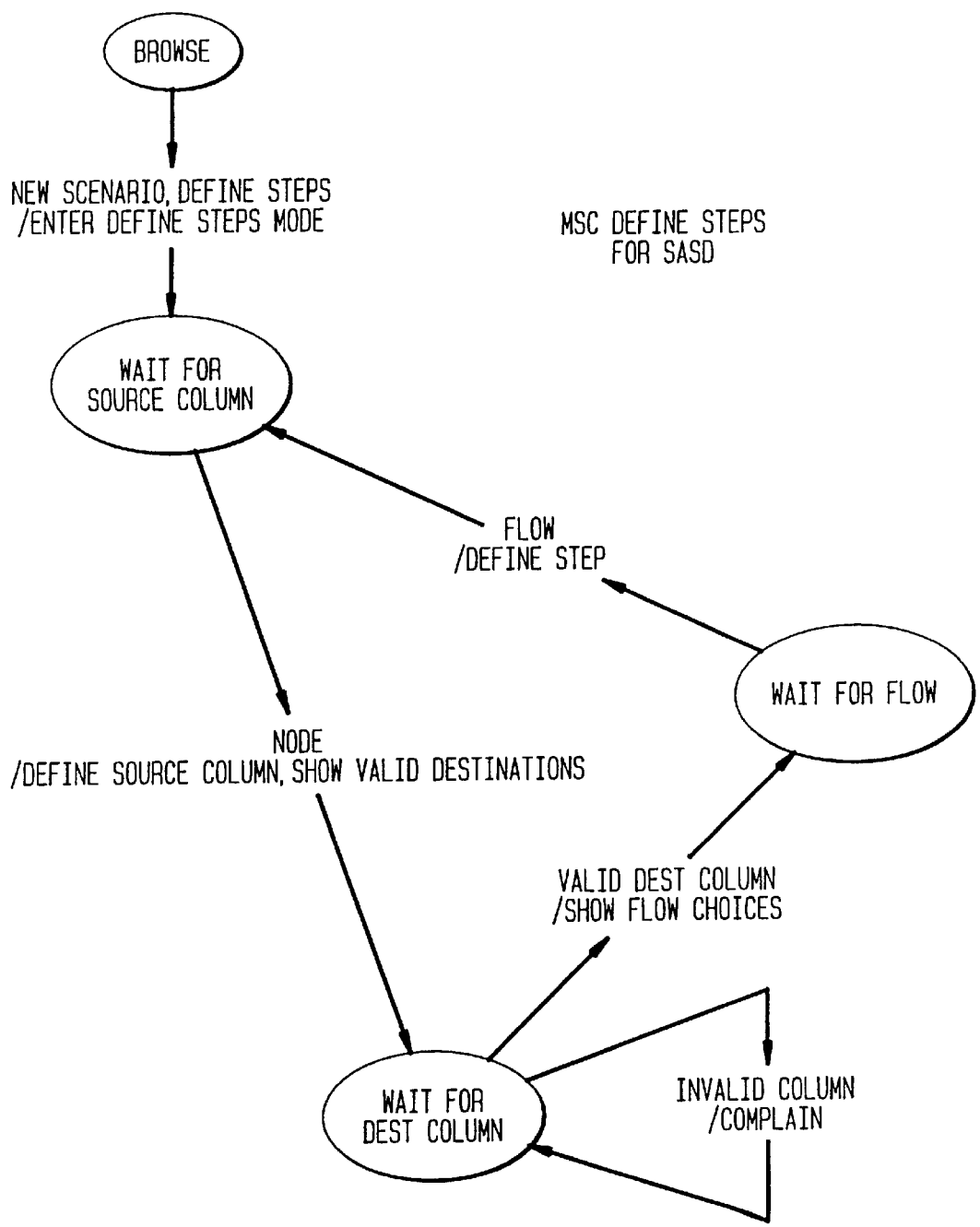

The state machine of FIG. 26 illustrates MSC step definition for SASD. The system transitions from Browse mode to Define steps mode when the user selects New scenario or Define steps. The system then awaits selection of the source column by the user. When a selection of a column is made, the system awaits the seledction of a destination column. If there is an invalid column while waiting for destination, there will be a complaint message. When a valid column obtains, since this is on a SASD data flow, all the legal connections can be presented for selection. In the event of only one single valid connection being possible, it is provided automatically and the step is defined.

Figure 27:
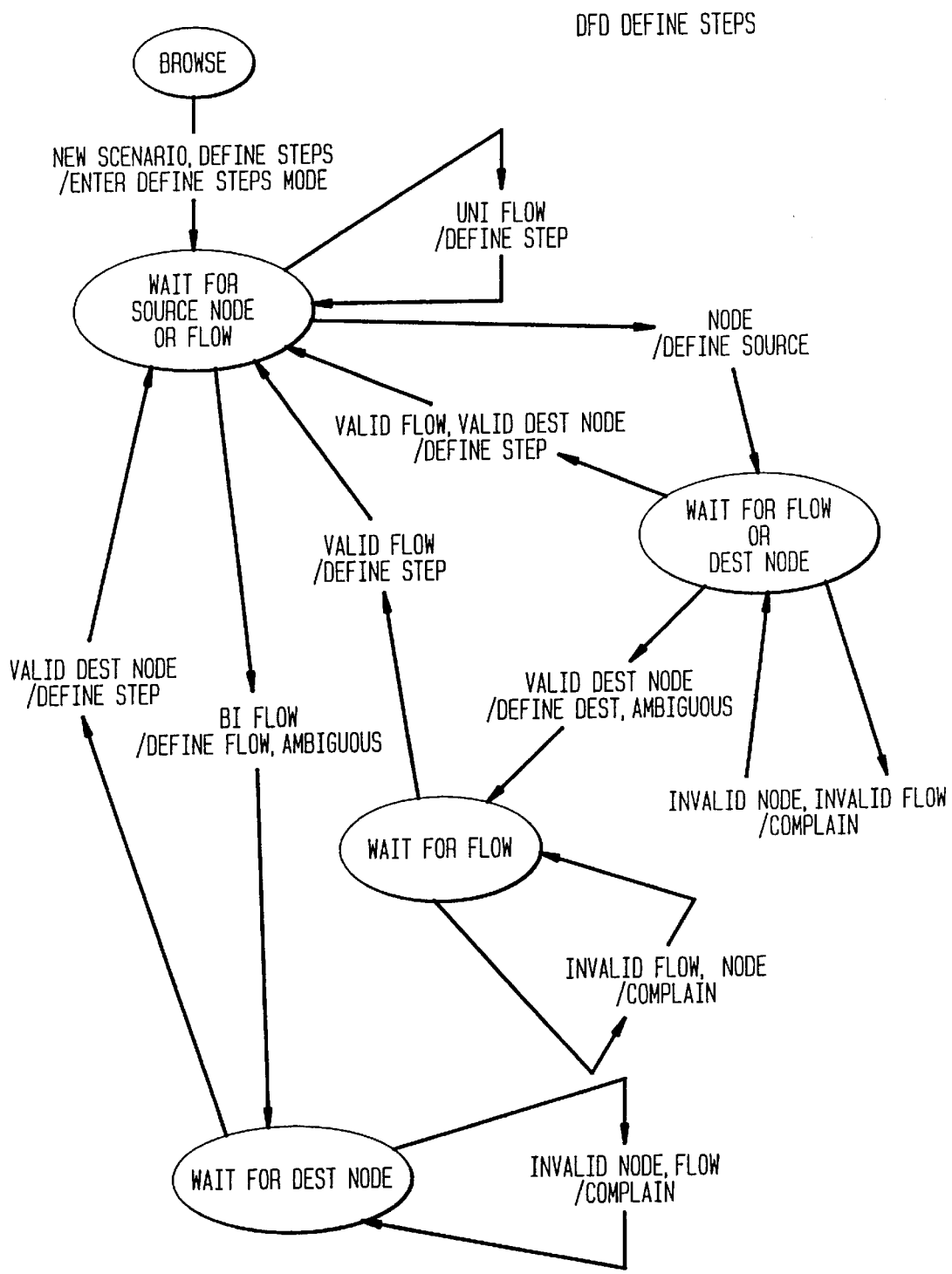

In FIG. 27, illustrating DFD step definition, the defining steps are shown on a data flow diagram in the DFD view. The user leaves browse mode and enters Define steps node by selecting New Scenario or Define Steps. At this point, the system awaits the user to select a node or a flow. If a unidirectional flow is picked, that is sufficient to define a step because it is unambiguous and it connects two nodes to each other. If a bidirectional flow is picked, that is an ambiguous state and one must define which one of the connected nodes is the destination, so the system then awaits a destination nodes. If something invalid is entered, a complaint will be issued. If a valid destination is chosen, a step is defined and the system returns to Wait for source node and awaits user selection of a source node or a flow. If a node is selected, the system enters Wait for a flow or a destination node and awaits the user selection of a node or a flow. If an invalid node or invalid flow is selected, a complaint is issued. If a valid flow or a valid destination node is selected, the step is defined. A valid flow is defined by a line having at least an outward flow arrow. A valid destination node connected by a line having at least an outward flow arrow. If a valid destination is selected the path to which is ambiguous, then the system enters the Wait for flow state pending user selection of a flow. Selection of an improper flow, a complaint is issued. Selection of a valid flow defines a step.

Figure 28:
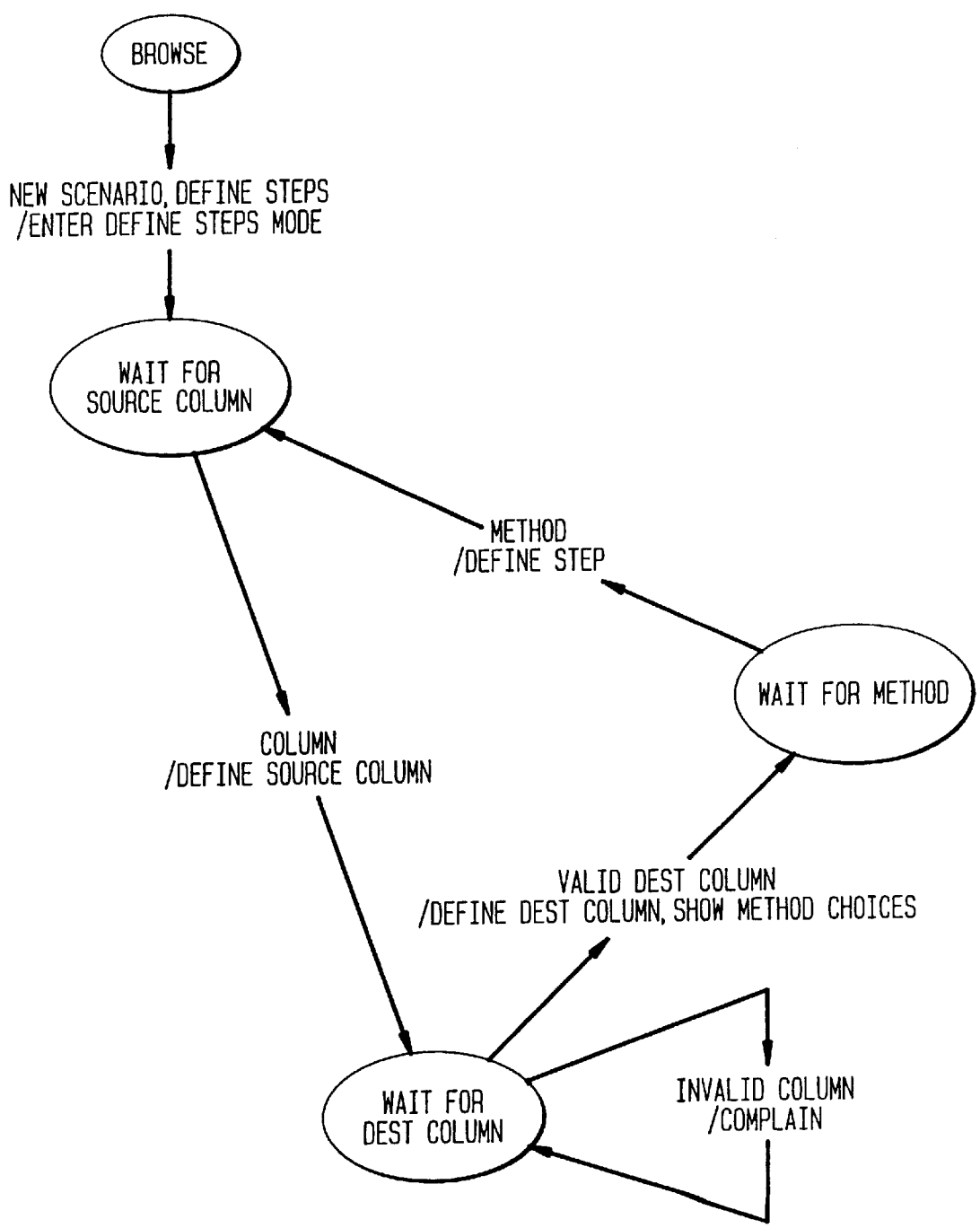

The state machine of FIG. 28 illustrates MSC step definition for OO. The system transitions from Browse mode to Define steps mode when the user selects New scenario or Define steps. The system then awaits selection of the source column by the user. When a selection of a column is made, the system awaits the seledction of a destination column. If there is an invalid column while waiting for destination, there will be a complaint message. When a valid column obtains, all the methods offered by the destination column are presented for selection. When the user makes a selection, the step is defined.

While the invention has been described by way of exemplary embodiments, it will be understood by those skilled in the art to which it pertains that various changes and modifications can be made to such embodiments without departing from the spirit of the invention which is intended to be limited only by scope of the claims following and their equivalents.

What is claimed is:

1. A scenario presentation method for use in software development for the definition, maintenance, and presentation of scenarios, said scenarios comprising a series of steps representing the dynamic behavior of a system, said method comprising the steps of:

utilizing a system description comprising a hierarchy of purely symbolic data flow diagrams with the data representing software subsystems so that said data flow diagrams represent a functional decomposition of said system, wherein said data flow is in purely symbolic form;

reading and presenting the system description, defining software elements from the system description for facilitating the definition, maintenance, and presentation of scenarios;

defining a sequence of steps by defining software elements from said system description as represented by selecting software elements on said data flow diagrams in accordance with a predetermined syntax; and saving said steps with sufficient information to reproduce the scenarios.

2. A scenario presentation method as set forth in claim 1 wherein said system description comprises an object model of the type utilized in object oriented analysis and including means for reading and displaying such object information and selecting elements therefrom, said object model representing the result of an object oriented analysis of said system, wherein said sequence of steps is defined by selecting and defining software elements from said model in accordance with a predetermined syntax and said steps are saved with sufficient information to reproduce the scenarios in the event the model has changed.

3. A scenario presentation method as set forth in claim 2 wherein, when a scenario is at least in part defined, including a step of sequential animation wherein said steps are animated sequentially by way of a graphical technique.

4. A scenario presentation method as set forth in claim 3 wherein said animation step includes the presentation of a pertinent textual annotation.

5. A scenario presentation method as set forth in claim 3 wherein said animation step includes the presentation of a pertinent voice annotation.

6. A scenario presentation method as set forth in claim 3 wherein said sequential animation is synchronized with said pertinent voice annotation.

7. A scenario presentation method as set forth in claim 3 wherein said sequential animation is synchronized with said pertinent voice annotation such that animation of a step does not begin until completion of the voice annotation pertaining to the preceding step.

8. A scenario presentation method in accordance with claim 3 wherein said animation occurs in single steps subject to user control.

9. A scenario presentation method in accordance with claim 3 wherein said animation occurs in a continuous mode.

10. A scenario presentation method in accordance with claim 3 wherein said chosen scenario is displayed as a message sequence chart.

11. A scenario presentation method as set forth in claim 2, wherein said scenario comprises a header, diagram information and a step list.

12. A scenario presentation method as set forth in claim 11, wherein said scenario comprises a requirements list and a columns list.

13. A scenario presentation method as set forth in claim 12, wherein said header comprises a scenario name, a filename version, textual annotation or description, a methodology, a viewform, an initial state a voice annotation or soundfile.

14. A scenario presentation method as set forth in claim 12 wherein said columns list comprises an object and an initial state for said object.

15. A scenario presentation method as set forth in claim 12 wherein said Requirements list comprises a name and a description.

16. A scenario presentation method as set forth in claim 11 wherein said diagram information comprises a model, a diagram ids, diagram names, elements, element types, positions, sizes, names, instance numbers, ids, and flow direction.

17. A scenario presentation method as set forth in claim 11 wherein said Step list diagram source object destination object, a method invocation on the destination.

18. A scenario presentation method as set forth in claim 1 wherein said system description comprises a hierarchy of data flow diagrams of the type utilized in structured analysis and structured design, and including means for reading and displaying such data flow diagrams and selecting elements thereon, for facilitating the definition, maintenance, and presentation of scenarios, said data flow diagrams representing a functional decomposition of said system, wherein said sequence of steps is defined by selecting elements on said data flow diagams in accordance with a predetermined syntax and said steps are saved with sufficient information to reproduce the scenarios in the event the data flow diagrams are missing, at least in part.

19. A scenario presentation system as set forth in claim 18 and including a browse mode, wherein said definition comprises the following steps:

upon selection by a user of one of New Scenario and Define steps, said system leaves said browse mode and enters a Define steps mode, said system at this point awaiting said user to select one of a source node and a flow;

selection of a unidirectional flow being sufficient to define a step because it is unambiguous and it connects two nodes to each other;

upon selection of a bidirectional flow, this being an ambiguous state requiring a definition of which one of said nodes is the destination, said system awaits a destination node; and upon receiving an invalid entry, issues a complaint signal.

20. A scenario presentation system as set forth in claim 19 wherein said definition comprises the following steps:

upon selection by a user of one of New Scenario and Browse modes, said system transitions from Browse mode to a Define steps mode;

upon selection of a source column by the user, said system awaits selection of a destination column;

upon selection of an invalid column while waiting for destination, said system will issue a complaint message;

upon selection of a valid column, said system presents for selection all legal connections, since this is on a SASD data flow, all the legal connections can be presented for selection; and in the event of only one single valid connection being possible, said system provides it automatically and the step is defined.

21. A scenario presentation method as set forth in claim 18 wherein a step conveys information from a source node to a destination node by way of data flow, wherein said step of saving includes storing diagrammatic information on said source node, said destination node, and said data flow.

22. A scenario presentation method as set forth in claim 21 wherein said diagrammatic information includes name, position, and type information on said nodes and data flow, with directionality information.

23. A scenario presentation method as set forth in claim 18 including a step of conveying information from a source node to a destination node by way of data flow, wherein said information includes any of a value, a data type, and a symbolic reference.

24. A scenario presentation method as set forth in claim 18 insluding a step of conveying information from a source node to a destination node by way of data flow, wherein said information includes any of a voice annotation, textual annotation, and state change information.

25. A scenario presentation method as set forth in claim 18, wherein said scenario comprises a header, diagram information and a step list.

26. A scenario presentation method as set forth in claim 25, wherein said scenario comprises a requirements list and a columns list.

27. A scenario presentation method as set forth in claim 26, wherein said header comprises a scenario name, a filename version, textual annotation or description, a methodology, a viewform, an initial state a voice annotation or soundfile.

28. A scenario presentation method as set forth in claim 26 wherein said columns list comprises a diagram and a node.

29. A scenario presentation method as set forth in claim 28 wherein said definition comprises the following steps:
  upon selection by a user of one of New Scenario and Browse modes, said system transitions from Browse mode to a Define steps mode;
  upon selection of a source column by the user, said system awaits selection of a destination column;
  upon selection of an invalid column while waiting for destination, said system will issue a complaint message;
  upon selection of a valid column, said system presents for selection all legal connections, since this is on a SASD data flow, all the legal connections can be presented for selection; and
  in the event of only one single valid connection being possible, said system provides it automatically and the step is defined.

30. A scenario presentation method as set forth in claim 26 wherein said Requirements list comprises a name and a description.

31. A scenario presentation method as set forth in claim 25 wherein said diagram information comprises a model, a diagram ids, diagram names, elements, element types, positions, sizes, names, instance numbers, ids, and flow direction.

32. A scenario presentation method as set forth in claim 25 wherein said diagram information comprises model column information (MSC) saved in the order it was last displayed, column names, column positions, rows saved as flows in sequence from top to bottom, names, positions, directions, source, and destination.

33. A scenario presentation method as set forth in claim 25 wherein said Step list comprises a diagram, a source node, a flow id, a destination node, an id value, a description, a state, a state scope, and a soundfile.

34. A scenario presentation method as set forth in claim 25 wherein said Step list comprises a diagram, a source object, a destination object, and a method invocation on the destination.

35. A scenario presentation method for use in software development for the definition, maintenance, and presentation of scenarios, said scenarios comprising a series of steps representing the dynamic behavior of a system, said method comprising the steps of:
  utilizing a hierarchy of purely symbolic data flow diagrams and means for reading and displaying data flow diagrams, with the data representing software subsystems so that said data flow diagrams represent a functional decomposition of said system, wherein said data flow is in purly symbolic form;
  selecting elements on said data flow diagrams for facilitating the definition, maintenance, and presentation of scenarios, said data flow diagrams representing a functional decomposition of said system;
  defining a sequence of steps by selecting and defining software elements as represented by selecting software elements on said data flow diagrams in accordance with a predetermined syntax; and
  saving said steps with sufficient information to reproduce the scenarios in the event the data flow diagrams are missing, at least in part.

36. A scenario presentation method as set forth in claim 35 and including a browse mode, wherein said definition comprises the following steps:
  upon selection by a user of one of New Scenario and Define steps, said system leaves said browse mode and enters a Define steps mode, said system at this point awaiting said user to select one of a source node and a flow;
  selection of a unidirectional flow being sufficient to define a step because it is unambiguous and it connects two nodes to each other;
  upon selection of a bidirectional flow, this being an ambiguous state requiring a definition of which one of said nodes is the destination, said system awaits a destination node; and
  upon receiving an invalid entry, issues a complaint signal.

37. A scenario presentation method as set forth in claim 35 wherein a step conveys information from a source node to a destination node by way of data flow, wherein said step of saving includes storing diagrammatic information on said source node, said destination node, and said data flow.

38. A scenario presentation method as set forth in claim 35 wherein said diagrammatic information includes name, position, and type information on said nodes and data flow, with directionality information.

39. A scenario presentation method as set forth in claim 38, wherein said scenario comprises a requirements list and a columns list.

40. A scenario presentation method as set forth in claim 38, wherein said header comprises a scenario name, a filename version, textual annotation or description, a methodology, a viewform, an initial state a voice annotation or soundfile.

41. A scenario presentation method as set forth in claim 38 wherein said diagram information comprises a model, a diagram ids, diagram names, elements, element types, positions, sizes, names, instance numbers, ids, and flow direction.

42. A scenario presentation method as set forth in claim 38 wherein said diagram information comprises model column information (MSC) saved in the order it was last displayed, column names, column positions, rows saved as flows in sequence from top to bottom, names, positions, directions, source, and destination.

43. A scenario presentation method as set forth in claim 38 wherein said Step list comprises a diagram, a source node, a flow id, a destination node, an id value, a description, a state, a state scope, and a soundfile.

44. A scenario presentation method as set forth in claim 38 wherein said Step list comprises a diagram, a source object, a destination object, and a method invocation on the destination.

45. A scenario presentation method as set forth in claim 35 including a step of conveying information from a source node to a destination node by way of data flow, wherein said information includes any of a value, a data type, and a symbolic reference.

46. A scenario presentation method as set forth in claim 45 wherein said columns list comprises a diagram and a node.

47. A scenario presentation method as set forth in claim 45 wherein said Requirements list comprises a name and a description.

48. A scenario presentation method as set forth in claim 46 wherein said animation step includes the presentation of a pertinent textual annotation.

49. A scenario presentation method as set forth in claim 46 wherein said animation step includes the presentation of a pertinent voice annotation.

50. A scenario presentation method as set forth in claim 49, wherein said header comprises a scenario name, a filename version, textual annotation or description, a methodology, a viewform, an initial state a voice annotation or soundfile.

51. A scenario presentation method as set forth in claim 49 wherein said diagram information comprises a model, a diagram ids, diagram names, elements, element types, positions, sizes, names, instance numbers, ids, and flow direction.

52. A scenario presentation method as set forth in claim 49 wherein said Step list diagram source object destination object, a method invocation on the destination.

53. A scenario presentation method as set forth in claim 46 wherein said sequential animation is synchronized with said pertinent voice annotation.

54. A scenario presentation method as set forth in claim 53 wherein said columns list comprises an object and an initial state for said object.

55. A scenario presentation method as set forth in claim 54 wherein said Requirements list comprises a name and a description.

56. A scenario presentation method as set forth in claim 30, including the step of generating a textual transcript of said scenario.

57. A scenario presentation method as set forth in claim 1, including the step of generating a textual transcript of said scenario.

58. A scenario presentation method as set forth in claim 35 insluding a step of conveying information from a source node to a destination node by way of data flow, wherein said information includes any of a voice annotation, textual annotation, and state change information.

59. A scenario presentation method as set forth in claim 35, wherein said scenario comprises a header, diagram information and a step list.

60. A scenario presentation method for use in software development for the definition, maintenance, and presentation of scenarios, said scenarios comprising a series of steps representing the dynamic behavior of a system, said method comprising the steps of:

utilizing a hierarchy of purely symbolic data flow diagrams, with the data representing software subsystems so that said data flow diagrams represent a functional decomposition of said system, wherein said data flow is in purly symbolic form;

reading and displaying such data flow diagrams;

selecting elements on said data flow diagrams for facilitating the definition, maintenance, and presentation of scenarios, said data flow diagrams representing a functional decomposition of said system;

defining a sequence of steps by defining software elements, as represented by selecting software elements on said data flow diagrams in accordance with a predetermined syntax; and saving said steps with sufficient information to reproduce the scenarios in the event the data flow diagrams are missing, at least in part.

61. A scenario presentation method as set forth in claim 60 wherein, when a scenario is at least in part defined, including a step of sequential animation wherein said steps are animated sequentially by way of a graphical technique.

62. A scenario presentation method as set forth in claim 60, wherein said scenario comprises a header, diagram information and a step list.

63. A scenario presentation method as set forth in claim 60, wherein said scenario comprises a requirements list and a columns list.

64. A scenario presentation method as set forth in claim 60, including the step of generating a textual transcript of said scenario.

65. A scenario presentation method as set forth in claim 46 wherein said sequential animation is synchronized with said pertinent voice annotation such that animation of a step does not begin until completion of the voice annotation pertaining to the preceding step.

* * * * *